United States Patent
Danilov et al.

(10) Patent No.: US 11,194,638 B1
(45) Date of Patent: Dec. 7, 2021

(54) DEFERRED SCALING OF AN ORDERED EVENT STREAM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/200,652

(22) Filed: Mar. 12, 2021

(51) Int. Cl.
*G06F 9/54* (2006.01)

(52) U.S. Cl.
CPC .................... *G06F 9/542* (2013.01)

(58) Field of Classification Search
CPC ......... G06F 9/4812; G06F 9/542; H04L 29/06
USPC ....................................................... 719/318
See application file for complete search history.

(56) References Cited

U.S. PATENT DOCUMENTS

| | | | |
|---|---|---|---|
| 8,572,091 B1 | 10/2013 | Sivasubramanian et al. | |
| 8,825,848 B1 | 9/2014 | Dotan et al. | |
| 9,514,018 B2* | 12/2016 | Sikri | G06F 9/5061 |
| 9,898,482 B1 | 2/2018 | Bono | |
| 9,965,215 B1 | 5/2018 | Vazhenin et al. | |
| 11,016,826 B2* | 5/2021 | Lehmann | G06F 11/3017 |
| 2008/0301135 A1 | 12/2008 | Alves et al. | |
| 2011/0131588 A1* | 6/2011 | Allam | H04L 41/065 |
| | | | 719/318 |
| 2012/0102503 A1* | 4/2012 | Meijer | G06F 9/5094 |
| | | | 719/318 |
| 2012/0109985 A1 | 5/2012 | Chandrasekaran | |
| 2013/0226931 A1 | 8/2013 | Hazel et al. | |
| 2015/0169449 A1 | 6/2015 | Barrell et al. | |
| 2015/0172120 A1 | 6/2015 | Dwarampudi et al. | |
| 2015/0363245 A1* | 12/2015 | Mutschler | G06F 16/24568 |
| | | | 719/318 |
| 2016/0337435 A1 | 11/2016 | Nigam et al. | |
| 2017/0075832 A1 | 3/2017 | Bhimani et al. | |
| 2017/0075947 A1 | 3/2017 | Kurilov et al. | |

(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

(Continued)

*Primary Examiner* — Andy Ho
(74) *Attorney, Agent, or Firm* — Amin, Turocy & Watson, LLP

(57) ABSTRACT

Deferred scaling of an ordered event stream (OES) is disclosed. In contrast to conventional scaling of an OES, the disclosed deferred scaling can defer a scaling event where an impediment/condition to committing the scaling event is determined. This can comprise storing information corresponding to the scaling event as a virtual scaling event. The virtual scaling vent in some embodiments can be converted to an implemented scaling event at a later time. In a further embodiment, the virtual scaling event can be abandoned and the OES can continue to operate according to a last committed OES topology. In other embodiments, the virtual scaling event can be employed in determining a subsequent scaling event. Optionally, the subsequent scaling event can be an implemented scaling event or another deferred scaling event.

20 Claims, 10 Drawing Sheets

(56) References Cited

U.S. PATENT DOCUMENTS

| | | |
|---|---|---|
| 2017/0212891 A1 | 7/2017 | Pundir et al. |
| 2018/0121307 A1 | 5/2018 | Braun et al. |
| 2018/0184138 A1 | 6/2018 | Shaw et al. |
| 2018/0332325 A1 | 11/2018 | Kaitchuck |
| 2018/0332366 A1 | 11/2018 | Paduroiu |
| 2018/0332367 A1 | 11/2018 | Kaitchuck et al. |
| 2019/0026301 A1 | 1/2019 | Wang et al. |
| 2020/0034468 A1 | 1/2020 | Lei et al. |
| 2020/0174695 A1 | 6/2020 | Bazarsky et al. |
| 2020/0250172 A1 | 8/2020 | Busjaeger et al. |
| 2021/0110328 A1 | 4/2021 | Hsiao et al. |

OTHER PUBLICATIONS

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Office Action dated Oct. 1, 2021 for U.S. Appl. No. 16/915,762, 57 pages.

Office Action dated Oct. 1, 2021 for U.S. Appl. No. 17/127,724, 41 pages.

* cited by examiner

DEFERRED SCALING OF AN ORDERED EVENT STREAM

BACKGROUND

Conventional data storage techniques can scale an event stream, e.g., bifurcating a portion of the event stream into two other portions of the event stream in response to an indication that computing resources are being sufficiently burdened. In a conventional system, the two other portions can each store about 50% of the initial event stream. One use of data storage is in bulk data storage. Conventional scaling of an event stream of a stream data storage system can result in inefficient use of computing resources. The above-described background is merely intended to provide a contextual overview of some issues regarding conventional data storage, and is not intended to be exhaustive. Other contextual information may become further apparent upon review of the following detailed description.

DETAILED DESCRIPTION

Figure 1:
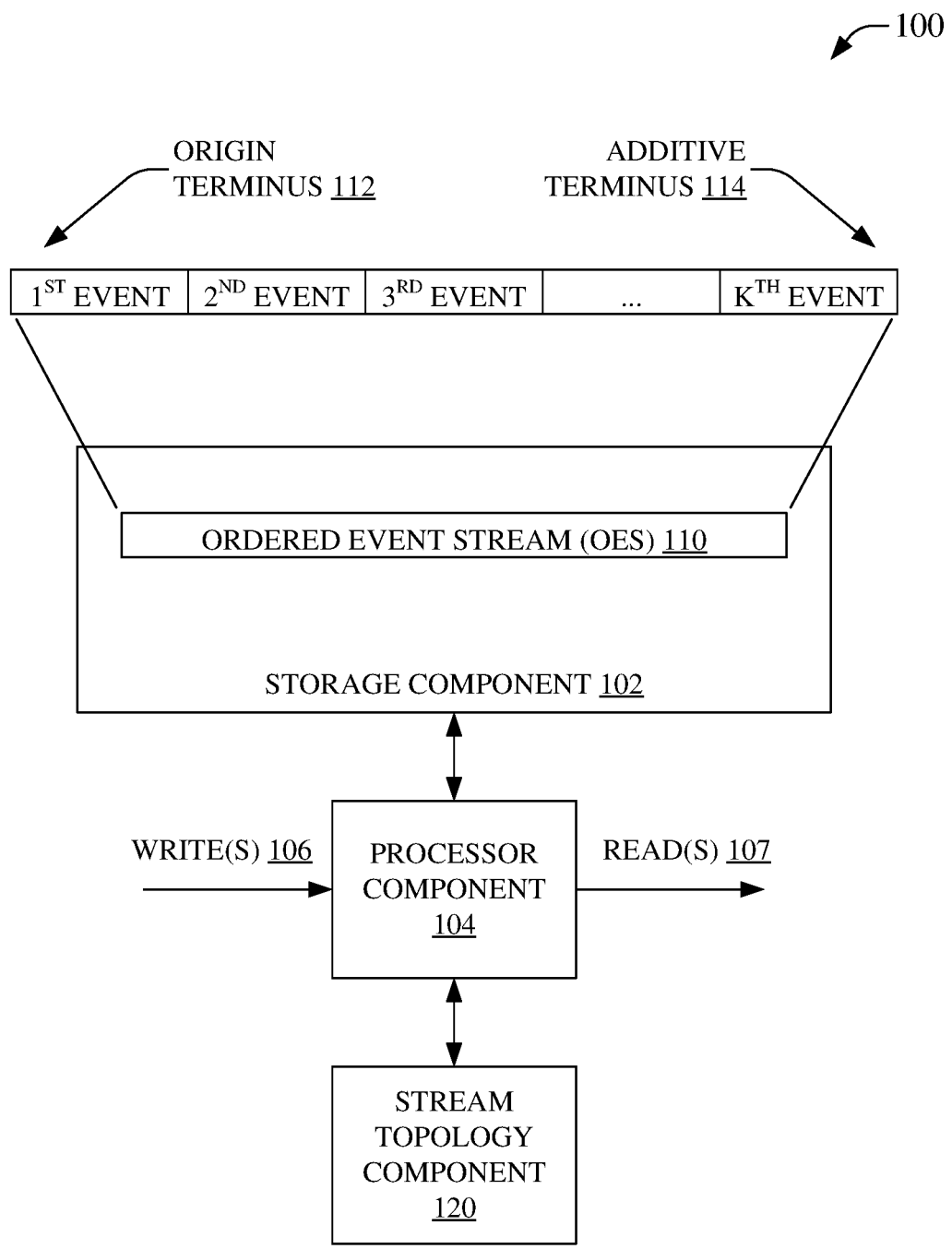
FIG. 1 is an illustration of an example system that can facilitate deferred scaling of an ordered event stream (OES), in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, conventional event stream storage techniques, for example, can scale an event stream via bifurcation of a portion of the event stream into two other event stream portions. This can be in prompt response to an indication that computing resources have transitioned a threshold utilization level. In a conventional system, these two other portions can generally represent an approximately even split of the initial event stream, e.g., each of the two resulting event stream portions can be about one half of the initial event stream in an attempt to divide the amount of computing resources used in the initial stream about evenly between the initial computing resources before the bifurcation of a stream and subsequent computing resources after bifurcation of the stream. As an example, if an initial event stream causes a load of two units of work for a first processor, the two units of work load can correspond to an even distribution of work across the associated key space of the initial event stream, and the two units of work can exceed a threshold work level of a first processor, the stream can therefore be split and a second processor can be employed in conjunction with the first processor, e.g., the first processor can supports a first portion of the stream at about one unit of work and a second portion of the stream can be supported at about one unit of work by a the second processor.

In contrast to conventional storage systems, the disclosed subject matter relates to data storage and, more particularly, to scaling of an ordered event stream (OES) of an OES data storage system. In various embodiments described herein, adapting scaling technology employed in a stream data storage system can improve a stream data storage system, such as by delaying implementation of scaling to improve use of computing resources in contrast to a conventional stream data storage system. In one or more example embodiments, a stream, e.g., an OES or portion thereof, can be divided evenly to distribute the work of supporting the event stream, e.g., splitting stream in to two subsequent similar portions. This can be termed 'symmetrical scaling' of an event stream. However, a stream can alternatively be split into dissimilar portions, termed 'asymmetrical scaling,' that can result in portions that do are dissimilar. Moreover, symmetric and asymmetric scaling can be from one portion of an OES into two or more subsequent other portions of the OES, for example, symmetrical splitting of a stream into three similar portions. In one or more embodiments, these other portions can also comprise a mix of symmetric and asymmetric splits of the stream, for example, a first portion of a stream can be split into a second, third, and fourth portion, wherein the second and third can be similar, e.g., symmetric, and the fourth portion can be dissimilar from the second or third portion, e.g., asymmetric. In this example, the scaling can be referred to as 'mixed scaling,' e.g., implying that the subsequent portions of the stream after scaling can comprise a mix of symmetric and asymmetric portions.

Scaling of the event stream can be in response to a threshold consumption of computing resources, e.g., when a threshold work level is traversed, an event stream can be scaled. In one or more embodiments, scaling can generally be associated with allocating computing operations to logical portions of an ordered stream of events. As an illustrative example, a first processor can satisfactorily write 5000 events per unit time to an ordered event stream, e.g., into storage corresponding to the ordered event stream, however, where the rate of events to be written to the stream, for example, doubles to 10000 events per unit time, the first processors can be determined to be underperforming due to being overly burdened and it can be desirable to scale the OES to compensate for overburdening of the first processor. As such, scaling can add a second processor such that the load on the first, and now the second, processors can be similar, e.g., the writing of the example 10000 events per unit time can be managed by two processors after the scaling rather than just the first processor before the scaling of the OES. As noted elsewhere herein, the scaling can be symmetric, asymmetric, or mixed scaling. It can be further noted that symmetric scaling of the logical key space of events can result in non-symmetric loading of computing resources. As an expansion of the previous example, where the first processor writes the 5000 events per unit time to event keys between 0 and 0.5 of the key space, and this load doubles as a result of an additional 5000 writes with an event key between 0 and 0.1 of the key space, then scaling the OES by symmetrically dividing the key space between the first processor from 0 to 0.25 and the second processor from 0.25 to 0.5 of the key space should not result in a symmetric division of computer resource loading, e.g., the first processor would now address a portion of the initial 5000 events and an additional burden from the 5000 events between 0 and 0.1 of the key space, while the second processor would address the initial 5000 events less the portion still being managed by the first processor. As such, mere equal division of a portion of an OES that is ignorant of the distribution of work across a key space of the event stream can be less effective that might otherwise be desired. Improved scaling technologies can be considerate of a resulting workload and can, for example, accommodate asymmetric scaling of a portion of an OES by key space, such that resulting workloads can be more evenly distributed to available computing resources. Moreover, advanced scaling techniques can perform scaling intelligently to burden portions of available computing resources according to the performance, capability, metrics, etc., of the individual portions of the available resources, e.g., adding an additional mid-range processor can result in a different scaling than adding another high-end processor. The instant disclosure illustrates, for example, deferral of scaling, wherein the deferral can reduce consumption of computing resources, e.g., committing a scaling event can consume computing resources so it can be desirable to scale in response to determining that the scaling would beneficial despite using resources to commit the scaling event. Accordingly, employing deferred scaling technology in a stream data storage system can improve the performance of the stream data storage system itself and, as such, can be desirable in contrast to a conventional stream data storage system that can indiscriminately scale in response to any traversal of a threshold loading of computing resources.

The presently disclosed subject matter can defer scaling of an OES or portion thereof, hereinafter typically referred to as an event stream, portion of an event stream, stream, portion of a stream, or other similar term, unless otherwise inherently or explicitly indicating otherwise. A stream can be a durable, elastic, append-only, unbounded sequence of so-called events. An event can be added to a head of a stream of events, e.g., a first event can be considered as residing at a tail of the event stream and a most recent event can be regarded as residing at the head of the stream with other events ordered between the tail and the head of the stream. The events need not be stored in contiguous storage locations to be logically sequenced in the stream representation, e.g., a first event can be stored on a first disk, a second event on a remotely located second disk, and a third event stored at a further remote third disk, the stream can logically sequence the first, second, and third events by reference to their stored data in different physical locations, the OES can be regarded as an abstraction comprising the events in an ordered manner. It is noted that some stream storage systems can employ an alternative head/tail terminology, for example, a first event can be added at a head of an OES, while subsequent new events can then be added sequentially to a tail of the OES, however, this is indistinguishable in all other ways from the head/tail convention generally employed in the instant disclosure, e.g., an event is still part of a sequence of events and corresponds to a key. Every event of the stream can be associated with a routing key, or simply key for convenience. A key can often be derived from data of the event, e.g., a "machine-id," "location," "device type," "customer number," "vehicle identifier," etc. In one or more embodiments, an event can be associated with a key, however, data yet to be written to an event can be associated with an access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, a access target value can correspond to data to be stored in an event and can be derived from that data or other characteristics corresponding to the data such that when the event is stored the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a "key's" value such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key unless more specificity is needed in some given example, and this convention is generally used in the instant disclosure for simplicity and brevity. Events with the same routing key can be written to a corresponding stream or stream segment, and can also be consumed, e.g., read, in the order they were written to the stream or stream segment.

A stream can be comprised of a group of portions, e.g., shards, partitions, pieces, etc., that can generally be referred to as stream segments, or simply segments for convenience. The segments can act as logical containers for one or more events within a stream, e.g., it is understood that events written to geographically disparate data storage devices can logically be written to the same stream segment, e.g., same logical container, according to the instant disclosure. When a new event is written to a stream, it can be stored to a segment of the stream based on a corresponding key. Event routing keys can be hashed to form a "key space". The key space can be employed to divide the stream into a number of parts, e.g., segments. In some embodiments, consistent hashing can be employed to assign events to appropriate segments. As an example, where a stream comprises only one segment, all events to be written to the stream are written to the same segment in an ordered manner and the segment corresponds to the entire key space. As another example, where a stream comprises two segments, the key space of the event, e.g., from zero to 'n', can be associated with the two segments, however each of the two segments can be associated with a portion of the total key space, for example, the first segment can store events with a key between zero and 'm' and the second segment can store events with a key between 'm+1' and 'n'. It will be appreciated that more segments can serve to further divide the key space such that a segment can store an event with a key falling within the range of the key space associated with that segment. As an example, a four segment event stream can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In one or more embodiments, a segment of an event stream is generally associated with a single processing instance to assure ordering of the events stored in the segment. A processing instance can be a single real physical processor, a virtualized processor instance executing on one or more real physical processors, a group of real physical processors, a group pf virtual processor instances executing on one or more real physical processors, etc. As an example, a processing instance can be embodied via a blade server in a computing facility. As another example, a processing instance can be a virtual processor deployed in an elastic computing system, e.g., a 'cloud server,' etc.

Typically, a processing instance can be associated with a level of performance which, in some embodiments, can be measured via one or more key performance indicators (KPIs) for the processing instance. As an example, a first blade server can have a first level of performance and a second blade server can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support costs, real estate for deployment costs, operations per unit time as a cost, etc. As such, selecting an appropriate processing instance can be associated with optimizing cost. As an example, if an event stream typically consumes less than one unit of work, then pairing the stream with a processing instance that can perform one unit of work can be a better use of computing resources, e.g., lower overall aggregate costs, etc., than pairing the even stream with a processing instance that can perform 200 units of work which can result in wasting up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In one or more embodiments, a segment can be scaled where a threshold level of performance occurs. As an example, an event stream segment can typically consume less than one unit of work, e.g., one unit of computing resources, and the stream segment can be associated with a processing instance that can perform up to one unit of work. However, in this example, where the segment increases demand to 1.5 units of work, it can be desirable to scale the segment, e.g., split into two daughter segments, such that each daughter segment can be associated with events for a portion of the key space of the parent segment prior to a scaling event. In this example, where the daughter segments can each be associated with a processing instance that can perform one unit of work, and where the key space of the initial segment can have a generally even distribution of work, then each daughter segment, for example, can be associated with about 0.75 units of work, e.g., about evenly splitting the 1.5 units of work of the parent segment in this example. As such, the parent segment exceeding the capacity of the existing processing instance can correspond to a scaling event that can split the parent into two daughter segments that can each then experience about 0.75 units of work.

It is noted that prompt scaling, in some instances, can be undesirable in comparison to deferring scaling, for example, where prompt scaling can result less than a threshold level of change in consumption of computing resources. As a first example, where an OES can have only one available processor, then scaling of this example OES can result in the one processor still supporting the full computing load despite committing the example scaling event. In fact, in this first example, scaling the OES can counterintuitively increase the load on the example single processors by adding computing tasks corresponding to the committing of the scaling event itself. It can be readily appreciated in this example, without additional computing resources, scaling can fail to achieve the desired goal of better distribution of computing resource demands and can even be counterproductive by increasing loading of the example processor to perform the scaling itself. In an extreme version of this example, the additional load on the example single processor can trigger further scaling, e.g., in a poorly controlled feedback loop, that could result in crashing the stream storage system by overburdening the example processor with computational demands related to the now looping scaling. In a second example, symmetric scaling of asymmetrically loaded streams can result in adding segments that may not effectively aid in distributing workload of the OES storage system to additional computing resources. In this second example, a segment that becomes heavily loaded in a narrow band of keys can be poorly served by symmetric scaling where newly added computing resources may not effectively receive a sufficiently large portion of the work associated with the narrow band of keys. As a third example, scaling that is not based on performance of computing resources can result in poor distribution of work via scaling. In this third example, scaling that evenly divides a large workload between an existing high-end processor and a newly added low-end processor can result in highly over burdening the newly added processor, which can clearly be undesirable. In a fourth example, frequent/prompt scaling can be problematic in that it can consume computing resources to commit a scaling event that can be in response to a change in demand that can be transient, e.g., heuristic control can limit scaling event oscillation that otherwise could consume substantial computing resources. Deferring scaling of an OES can result in not immediately consuming computing resources associated with committing a scaling event.

Where a projected level of improvement for a possible scaling event is insufficient, e.g., a determined benefit of a possible scaling event does not satisfy a rule permitting the scaling event to be performed, the scaling event can be deferred. In one or more embodiments, the deferral can comprise declining to perform the scaling event. Failure to satisfy the rule can result in later computing another scaling event benefit and again determining if the rule to permit scaling is satisfied, e.g., iteratively determining permission to commit a scaling event based on current states of an OES storage system. However, failure to satisfy the rule can also result in virtually committing the scaling event, e.g., not actually committing the scaling event, but rather storing a state of the OES according to a model of having applied the scaling event. In one or more embodiments, this 'virtual scaling event' can result in no actual change to the OES in comparison to committing the scaling event in reality, however, the OES can act as if the scaling event had been committed in regard to further scaling events. The state of the OES after the virtual scaling can be employed in determining if a future scaling event satisfies the permission to commit a scaling event rule. As an example, an OES in state A can trigger a scaling analysis that can result in the permission rule not being satisfied. In this example, the OES would not commit the scaling event. As such, in this example, the OES can remain in state A and at some future point can perform another scaling event analysis according to the OES conditions at that future time. However, as is disclosed herein, the OES can virtually commit the scaling such that the OES physically remains in state A but stores a scaling waypoint of the OES being in state B. As such, in this example, future scaling event analysis can determine if scaling from state B is permitted by satisfying another instance of the permission rule. Where the future scaling analysis is permissive, then the scaling of OES can be from state A to state C via virtual state B. In one or more embodiments, use of virtual scaling can preserve the computations, analysis, etc., performed in relation to the virtual scaling event so that they do not need to be redetermined, e.g., the analysis has already been performed so there is no reason to throw out these values, even if the values are insufficient to commit a scaling event in reality. However, because the virtual scaling event is not committed in reality, any eventual real commitment of a future scaling event can leverage the state of the OES determined for an interviewing virtual scaling event. Moreover, virtual scaling events can be ignored, such as where an OES environment has substantially changed, where the conditions resulting in the virtual scaling have reverted, etc. As an example, a virtual scaling can be determined for an OES based on a change in demand but a lack of additional available computing resources. In this example, addition of more computing resources can enable real commitment of the virtual scaling event. Also, in this example, where the demand reverts to the pre-virtual scaling level, the virtual scaling can simply be deleted because it was never actually committed. Additionally, in this example, where demand continues to increase and where additional computing resources become available, the virtual scaling state can be employed in an analysis of another scaling event that can be determined based, in part, on the virtual scaling and the subsequent changes in the OES environment.

As is noted, committing a scaling event can entail consuming additional processing; reassignment of writing instances that write events to, and/or reading instances that read events from, the segment(s) of the stream; adding effort and expense spooling up/down processing instances, purchasing additional network resources, dedicating time commitments from a technology support group, etc. As such, scaling is generally not to be performed without determining that an adequate impact on an event stream storage system can result from committing the scaling event. As an example, scaling during an intermittent or transient change in demand for computing resources, e.g., brief and changing increases/decreases in needed work capacity for a stream segment, can be disfavored because a determined benefit can be outweighed by a determined cost, e.g., monetary and/or non-monetary cost, to commit one or more corresponding scaling event(s), although the scaling can be performed where the determined benefit is sufficient in comparison to the determined cost. Typically scaling is desirable where there exists a determined longer-term benefit. As such, a threshold value less than the maximum work that can be performed by a computing instance can be associated with determining if a scaling event will be undertaken. As an example, where a parent segment reaches 80% of a threshold level of work, a benefit value of scaling the segment can be determined to be sufficiently high to commit a scaling event, e.g., where the benefit value satisfies a scaling rule, the parent segment can then be scaled into daughter segments. The benefit value can be determined based on an expected performance of the daughter segments. As an example, if the parent segment reaches 80% consumption of computing resources, e.g., 80% work, then where the key space is evenly distributed, each daughter can be expected to inherit 40% consumption of the computing resources where each processing instance is generally capable of about one unit of work. This results in each processing instance consuming 40% less work than the parent and can leave sufficient available computing resources to allow for further increase in each of the daughter segments that could be difficult for the parent to manage without scaling. This level of improvement and the resulting daughter segments being under an example threshold of 80% consumption of corresponding processing instance resources can be determined to satisfy the scaling rule and the segment can be scaled up. It is noted that the example daughter segments can later be scaled down, e.g., combined into a single segment, combined with other segments, etc., for example, where the daughter segments begin to consume less than, for example, 20% of the available computing resources, they can be scaled down into one granddaughter segment that can consume about 40% of a single processing instance. Further discussion of scaling down is generally not discussed herein for clarity and brevity, however it is expressly noted that scaling down is fully supported by the disclosed subject matter and is accordingly within the scope of the instant disclosure.

In one or more embodiments, distribution of events across a key space of an OES, or portion thereof, can be non-uniform. As an example, if an event stream has one segment that begins to consume 0.9 units of computing resources and is supported by a processing instance that can provide one unit of work with a scaling threshold value of 0.8 units, scaling can result in two daughter segments that each can consume 0.45 units of work where the work is generally evenly distributed across the key space of the parent segment, e.g., as is illustrated in an above example. However, where the distribution of work is non-uniform across the key space of the segment, for example where 0.8 units of the demand occurs in the lower half of the key space for the parent stream and only 0.1 units occurs in the upper half of the key space, then dividing the key space into daughters through symmetrical scaling, e.g., one taking the bottom half and one taking the top half of the key space, can result in one daughter segment having 0.8 units of demand and the other daughter segment having 0.1 units of demand. The daughter having 0.8 units of demand can already be ready for further scaling where the scaling threshold is 0.8 units. Use of asymmetric scaling, as disclosed elsewhere herein, can result in a more equitable scaling, e.g., the first daughter can inherit a portion of the parent key space having a work demand similar to the work demand from the balance of the parent key space. As such, the key space can be assigned to the daughter segments asymmetrically to enable balancing of work demanded by the resulting daughter segments.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate deferred scaling of an ordered event stream, in accordance with one or more embodiments of the subject disclosure. System 100 can comprise a storage component 102 that can store an ordered event stream (OES) 110. OES 110 can store one or more events. An event is associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110 in an ordered manner according to the key. Similarly, events with a same key can be read from OES 110 in an ordered manner, e.g., in the order they were previously written into OES 110. Components providing events to be written can be termed 'writers' and components requesting events can be termed 'readers'. As such, a writer can provide an event that can be written to OES 110 in an ordered manner based on a key associated with the event. Similarly, a reader can receive an event from OES 110 based on a key.

Processor component 104 of a system 100 can receive write(s) 106 that can be written to OES 110 stored on storage component 102. Processor component 104 of a system 100 can provide access to events of OES 110 based on a key, e.g., as read(s) 107 that can be communicated to a reader. Generally, one processing instance, e.g., processor component 104, etc., is designated for writing events to a portion, e.g., segment, of OES 110. OES 110 can comprise one segment and/or parallel segments, e.g., stream segments, see FIG. 2, etc., that can store events according to a key. In an example embodiment, more than one processing instance writing to a segment of an OES is typically disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. In an example embodiment, while more than one processing instance writing to a segment of an OES is typically disfavored, more than one processing instance reading from a segment it fully supported. As such, for a given number of segments, in some embodiments, there can be up to the same number of processing instances, e.g., to limit more than one processor instance writing to a segment. Although adding more processing instances is allowable, for example to increase read operations, these additional processing instances can be constrained to read operations to limit the possibility of scrambling an order of events being written to a segment. It is further noted that system 100 can comprise idle processing instances that are not reading or writing to the OES, for example as reserve processing instances supporting failover operations protecting against an active processing instance becoming less responsive, in support of scaling events, etc. In one or more embodiments, keys of one or more segments of an OES can represent a key space for OES 110, see FIG. 2, etc. Segments can therefore act as logical containers associated with a particular range of keys for a portion of an event stream and can be used to store events of OES 110. When a new event is written to a stream, it can be stored to a segment based on the event key. In an example embodiment, the key space can be divided into a number of ranges that can correspond to the number of segments comprising an OES, e.g., OES 110. As an example, a key space for an OES can be from 0 to 100, the OES can comprise two parallel segments wherein the first segment can sequentially store events with, for example, keys from 0 to 30, and the second segment can sequentially store events with keys from >30 to 100. In this example, a first event with a key of 54 can be appended to the second segment, a second event with a key of 29 can be appended to the first segment, a third event with a key of 14 can be further appended to the first segment after the second event, etc. In an example embodiment, storage component 102 can store one or more OESs, although only OES 110 is illustrated for clarity and brevity.

OES 110, as illustrated in system 100, can be an overly simplistic example of an OES that can comprise just one segment for storing incoming event write(s) 106 and sourcing event read(s) 107, and therefore the key space of OES 110 can be embodied in the illustrated single segment of events, e.g., the key space of OES 110 is not illustrated as being distributed across more than one parallel event storage segment. OES 110 can have an origin terminus 112. A first event can be written at origin terminus 112. The subsequent events can then be appended at an additive terminus 114 that is typically always at the head of the stream of written ordered events, e.g., a most recent event is written to the head of OES 110, which provides ordering of the events being written. This results in OES 110 allowing for continuous and unbounded data storage that can be a durable, elastic, append-only, unbounded sequence of events. As an example, a $(K+1)^{th}$ event can be appended to the $K^{th}$ event of OES 110 at additive terminus 114. In an example embodiment, storage component 102 can store any number of OESs. Moreover, any one OES can comprise any number of parallel segments, e.g., stings of events for a defined key space range. Each segment can comprise an ordered sequence of stored events.

In system 100, stream topology component 120 can facilitate adapting a topology of one or more OESs. In one or more embodiments, the adapting of the topology can comprise scaling of OES 110. Scaling can comprise 'scaling up,' e.g., increasing a count of parallel segments of OES 110, 'scaling down,' e.g., decreasing a count of parallel segments of OES 110, etc. As an example, increasing a number of parallel segments of OES 110 can result in division of the key space of OES 110 from one segment to two or more parallel segments. In one or more embodiments, it can be desirable to scale up a segment of an OES, e.g., OES 110, when a threshold consumption of computing resources is transitioned. The threshold consumption of computing resources can, in an embodiment, correspond to a level of performance of a related processing instance, e.g., processor component 104. As an example, if a processing instance, e.g., processor component 104, can perform 100 million operations per day, e.g., reads, writes, etc., an example threshold of 80 million operations can be selected. Accordingly, in this example, where OES 110 generally performs less than 80 million operations per day, scaling of OES 110 can be determined to be unnecessary. However, in this example, where events for OES 110 increase, for example to 82 million operations per day, scaling of OES 110, e.g., scaling up, can be indicated, for example to avoid overburdening processor component 104, etc.

Where scaling of OES 110, in the above example, is determined to be appropriate, stream topology component 120 can facilitate altering the topology of OES 110 from one segment to two or more parallel segments. This can result in dividing the key space of OES 110 among the now plural parallel segments. In one or more embodiments, processor component 104 can continue to perform all operations for the parallel segments, e.g., processor component 104 can read/write to more than one segment of events as is noted elsewhere herein, although this can fail to avoid possible overburdening of the processor in the above example. However, in some embodiments, one or more additional processing instances can be deployed to provide additional computing resources. It is noted that adding an additional processing instance without scaling up OES 110 can result in the newly added processing instance remaining idle because more than one processing instance is typically not allowed to write events into a segment of an OES to prevent scrambling the order of events. However, upon scaling up OES 110, for example, to two parallel segments, the addition of another processing instance can now be dedicated to one of the two parallel segments, e.g., one segment can typically be supported by up to one processing instance, two segments can be supported by up to two processing instances, three segments can be supported by up to three processing instances, . . . , w segments can be supported by up to w processing instances, etc. It is again noted that additional processor instances can be dedicated to read events, e.g., read(s) 107, whereby the count of processors can often exceed the count of segments.

Scaling up can increase a count of parallel segments of OES 110. There can also be an increase in the count of processing instances, e.g., additional instances of processor component 104 that are not illustrated. Scaling up can be enabled via stream topology component 120, e.g., based on one or more OES characteristics (OESCs), Based on storage system key performance indicators (KPIs), etc. Example OES characteristics can comprise a current computing resource demand, a count of segments, a distribution of work among the segments, a topology of an OES, a historical workload of one or more segments of an OES, etc. Example storage system KPIs can comprise loading of a processing instance, e.g., how heavily burdened is processor component 104, etc., threshold values for current and/or available computing resources, etc. Similarly, scaling down can be supported by stream topology component 120. As an example, where the number of operations performed in two parallel segments decreases, the lower levels of work being performed can be viewed as wasteful of processing instances allocated to these two example stream segments. As such, the segments can be condensed and one of the processing instances can be released. In some embodiments, the superfluous processing instance can be released without condensing the two example streams, e.g., there is generally no prohibition to one processing instance supporting two stream segments. While scaling down is not discussed at length for the sake of clarity and brevity, scaling down can be complementary to scaling up and all such complimentary operations are fully supported by the instant disclosure even where not explicitly recited. It is further noted that scaling up/down is generally associated with additional temporary burdening of computation resources, e.g., to remap reader(s) and/or writer(s) from a pre-scaling topology to an after-scaling topology, sealing pre-scaling segments, instantiating and/or releasing processing instances, providing a connection (bridging) between events of a pre-scaling stream to events of a prost-scaling stream, etc. As such, it is generally undesirable to arbitrarily scale OES 110, e.g., committing a scaling event is not 'free' and so can be limited to where it is 'cost effective' to commit the scaling event. Accordingly, scaling can be initiated in response to determining that the scaling likely will result in a topology that is determined to satisfy a scaling rule, as is discussed elsewhere herein.

Additionally, scaling can be deferred. A deferred scaling event can indicate that there is acknowledgement of a reason to perform a scaling event. As an example, changes to computing resource demands for an OES can be more efficiently managed after scaling, e.g., scaling an OES can allow more processing instances to participate in writing into an OES via changes in a count and scope of OES segments. However, despite this acknowledgment, there can be reasons to postpone or defer the committing of a scaling event, for example, there can be no additional available computing resources, which can result in the same number of computing resources managing the same amount of work regardless of committing a scaling event, etc. In one or more embodiments, deferring commitment of a scaling event can comprise determining a virtual scaling event which can aid in resolving commitment of a scaling event at a future time. As an example, where committing a scaling event is deferred due to a lack of additional computing resources, a virtual scaling event can be stored such that the virtual scaling event can be employed to commit a same or similar scaling event where the needed computing resources later become available, e.g., the virtual scaling event can be converted into a real scaling event, e.g., a committed scaling event in response to the computing resources becoming available in this example. It can be appreciated that computing resources can be spent to determine possible scaling events, more to analyze the possible scaling events, even more to select a scaling event based on the analysis, further use of computing resources can then be consumed by committing the scaling event, all of which can occur prior to the OES storage system storing data according to the scaled topology, e.g., according to a next epoch, see FIG. 2 and the related description. As such, it can be wasteful of computing resources to use many of these computing resources only to ignore the results if the scaling is not to be committed. Use of virtual scaling can preserve the scaling information determined without consuming computing resources to commit the scaling event. The virtual scaling event can then be employed as a modeled OES state from which a next possible scaling event can occur. As such, an OES can defer a first scaling event, virtualize the first scaling event, employ the virtual first scaling event to determine a second scaling event that is not deferred, and can then commit the second scaling event based on the virtual first scaling event, e.g., an OES can advance from a first epoch to a third epoch via a virtual second epoch.

Figure 2:
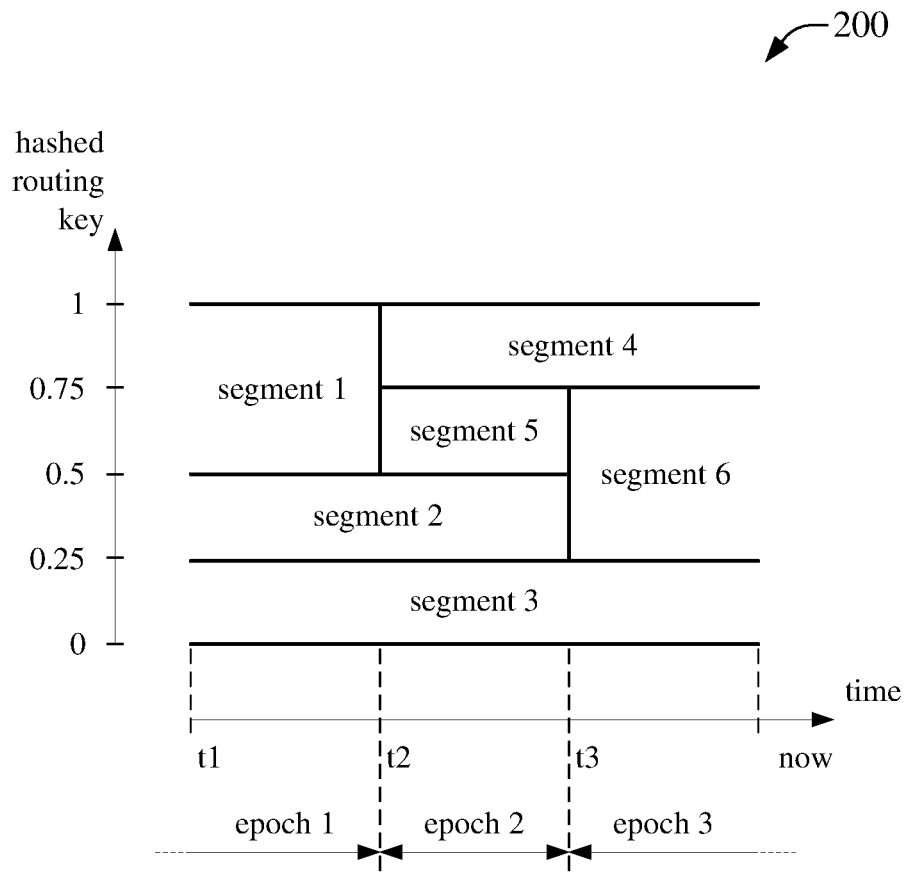
FIG. 2 is an illustration of an example scaling of an ordered event stream, in accordance with aspects of the subject disclosure.

FIG. 2 is an illustration of an example scaling of an ordered event stream 200, in accordance with one or more embodiments of the subject disclosure. Ordered event stream 200 can comprise segments. At a first time, for example t1, OES 200 can comprise one or more parallel segments, e.g., segment 1, segment 2, segment 3, etc. At some point a segment can be scaled. As an example, at t2, segment 1 can be scaled up. This can result in causing segment 4 and segment 5 and correspondingly sealing segment 1. The topology of the OES comprising segments 1-3 pre-scaling can be designated as epoch 1. Similarly, the topology of the OES comprising segments 4-5 and 2-3 can be designated as epoch 2.

In an example embodiment, segments 2 and 3 can be continuous across epochs 1 and 2 while segment 1 can end at the transition from epoch 1 to 2. In an example embodiment, in epoch 1, events associated with a key between 0.5 and 1, e.g., $0.5 > key \geq 1$, can be written (and read from) segment 1, while in epoch 2, events associated with a key between 0.75 and 1, e.g., $0.75 > key \geq 1.0$, can be written (and read from) segment 4 and events associated with a key between 0.5 and 0.75, e.g., $0.5 > key \geq 0.75$, can be written (and read from) segment 5. As such, access to events for a given key can be associated with reads in different epochs. As an example, reading an event with a key of 0.8 can read from both segment 1 and segment 4. Where the read is from head to tail, the read of example events with a key of 0.8 can begin reading in segment 4 and then continue reading into segment 1 across the epoch boundary between epoch 2 and 1. Similarly, where the read is from tail to head, events associated with the example key of 0.8 can begin in segment 1 and continue into segment 4 across the epoch boundary. However, it is noted that generally no additional events are written into segment 1 after the scaling event is committed and a new epoch is begun.

In epoch 2, the topology of OES 200 can comprise segments 4-5 and 2-3. At some point further scaling can be undertaken, e.g., at t3. OES 200 can, for example, scale down by condensing segment 2 and 5 into segment 6 at t3. This example scaling down can reduce a count of segments comprising OES 200. The scaling at t3 can result in ending epoch 2 and beginning epoch 3. The example scaling can cayuse segment 6 and can close segments 2 and 5. As such, in epoch 3, the topology of the OES comprising segments 3-4 and 6 post-scaling can distribute the key space of OES 200, for example, as $0 \leq segment\ 3 > 0.25$, $0.25 > segment\ 6 \geq 0.75$, and $0.75 > segment\ 4 \geq 1.0$.

In an example embodiment, where deferred scaling is employed, epoch 2 can be a virtual epoch, e.g., the scaling of segment 1 into segments 4 and 5 can be virtual. Where the scaling of segment 1 into segments 4 and 5 can be virtual, processors associated with writing into and/or reading from segment 1, e.g., for keys between 0.5 and 1.0, can continue to write in virtual epoch 2 the same as was performed in epoch 1 because the scaling is virtual and has not actually been committed in this example embodiment of OES 200. In this example embodiment, scaling into epoch 3 can be real, e.g., a scaling event from epoch 1 to epoch 3 can be committed, which scaling event can be based on virtual epoch 2. As such, in this example, segments 1 and 2 can be closed at t3 and segments 4 and 6 can be created at t3 according to the illustrated key space for this example embodiment of OES 200. Whereas epoch 2 in this example is virtual, segment 5 can have only been virtually created to facilitate scaling to epoch 3 and, as such, segment 5 has not been committed in OES 200 and only exists as a stored model as a waypoint to epoch 3. Similarly, in this example, commitment of segment 4 can begin at t3 rather than at t2, despite a virtual creation of segment 4 at t2, e.g., segment 4 between t2 and t3 only exists virtually and is not committed in OES 200. This can illustrate that virtual epoch 2 can function to facilitate further scaling, e.g., into epoch 3 from virtual epoch 2, without the virtual epoch ever being committed to an OES. Accordingly, the computations in determining virtual epoch 2 can be employed in determining a transition to epoch 3 from epoch 1 via virtual epoch 2, rather than simply discarding the computations for epoch 2 where it was determined that epoch 2 would not be committed in this example embodiment of OES 200. It is noted that in another embodiment, virtual epoch 2 can be discarded and a direct scaling from epoch 1 to epoch 3 can be performed, although this is not illustrated for clarity and brevity. In this or other embodiments, that discard or do not employ virtual scaling, deferral of committing a scaling event can be understood to decline to commit a scaling event based on criteria that can be distinct from triggering the scaling event process, e.g., first criteria can indicate that scaling can be beneficial, e.g., computing resource demand can increase and it can be beneficial to scale an OES, while second criteria can result in deferring commitment of a selected scaling event, e.g., despite the scaling being beneficial, there can be insufficient available computing resources, etc.

Figure 3:
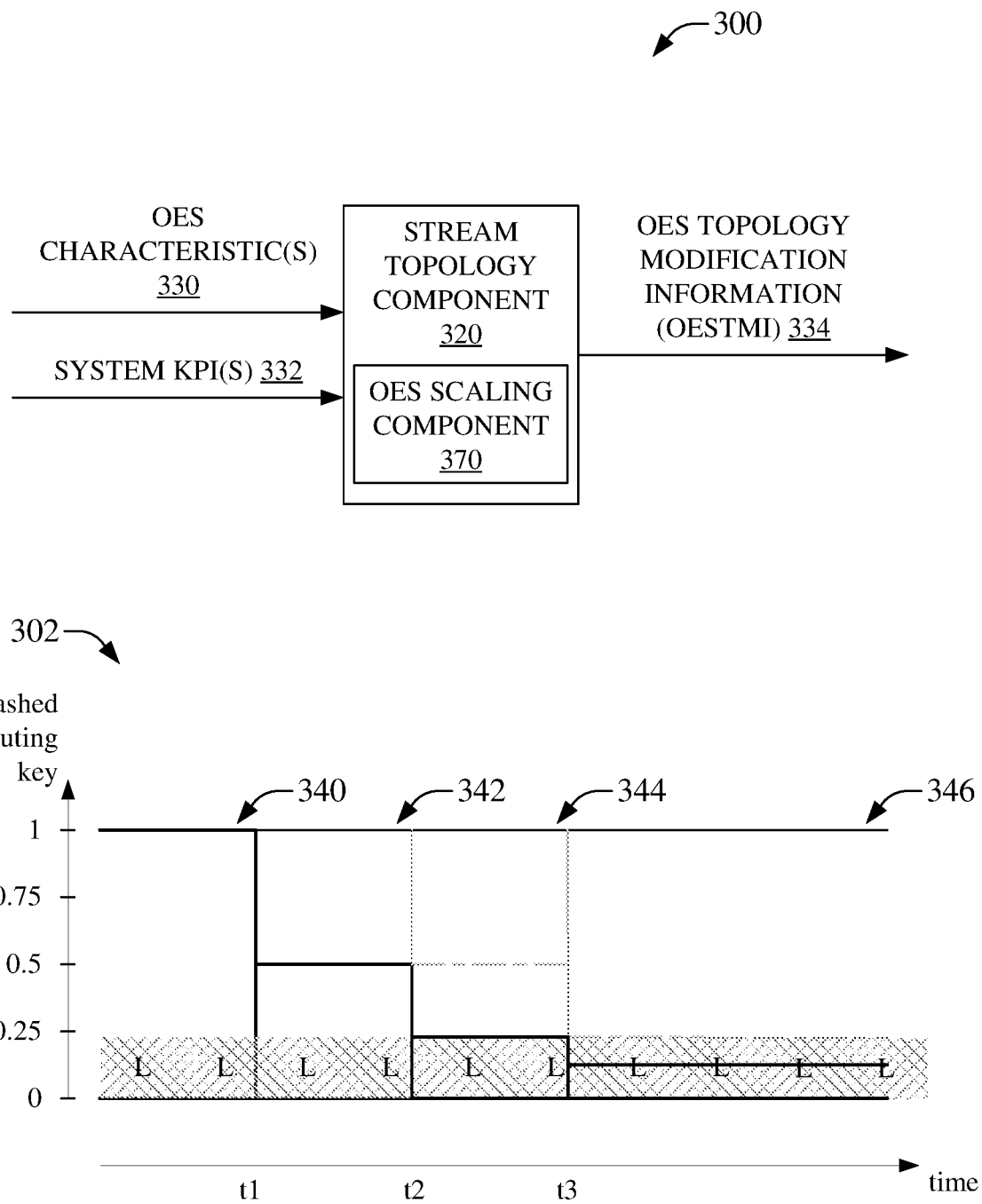
FIG. 3 illustrates an example system that can facilitate deferred scaling of an ordered event stream based on an OES characteristic and a storage system key performance indicator, in accordance with aspects of the subject disclosure.

FIG. 3 is an illustration of a system 300, which can facilitate deferred scaling of an ordered event stream based on an OES characteristic and a storage system key performance indicator (KPI), in accordance with one or more embodiments of the subject disclosure. System 300 can comprise stream topology component 320. Stream topology component 320 can receive information related to characteristics of an event storage system, such as current OES characteristic(s) 330, system KPI(s) 332, etc. Current OES characteristic(s) 330, for example, can comprise a topology of an OES, a current work load of an OES, a current performance of an OES, historical information for the OES such as historical work load(s), historical performance, etc. System KPI(s) 332, for example, can comprise processing instance performance indicators, historical processing instance performance indicators, availability of additional performance instance(s) and/or corresponding performance indicators, etc.

In one or more embodiments, these or other inputs to stream topology component 320 can be understood to represent, for example, what computing resources are available, how burdened are said computing resources now and/or in the past, what future computing resources can be needed, what future computing resources are available for implementation, etc. This type of information can be employed to determine if the OES topology should be adapted, how it should be adapted, and when it should be adapted. This determination can further be employed to determine if an adaption, e.g., a scaling event, should be deferred, e.g., committing a scaling event is desirable but there can be cause to delay committing the scaling event in the OES storage system. In an example, if an OES is storing customer data for a local company, the OES footprint might be relatively small and can be supported with low end processing instances in a simple OES topology. However, in this example, as the company grows to a national level there can be an increase in an amount of work performed, e.g., more event writes and reads to the example OES. This can increase to a level that begins to tax the initially dedicated computing resources, e.g., the initial processing instance can begin to approach a threshold performance level.

In one or more embodiments, for the above example, the historical increase in demand for computing resources can be employed by stream topology component 320 to predict that demand will outpace supply of computing resources and alternate topologies can be determined. These alternate topologies can be score and/or ranked. It is noted that this determination, ranking, etc., comes at the cost of expending resources, e.g., analysis and ranking can consume computing resources. An alternate topology, for example, a topology that scales up the OES and adds an additional processing instance, etc., can be selected based on the corresponding score, rank against other alternate topologies, etc. Accordingly, in this example, stream topology component 320 can generate OES topology modification information (OESTMI) 334 that can facilitate scaling of the example OES, e.g., according to the selected topology that scales up the OES segments and adds the additional processing instance. In this example however, where the additional processing instance may not yet available, the scaling of the OES according to the selected topology may correspondingly be impossible. Accordingly, in an example embodiment, one response can be to perform further iterations of alternate scaling topology analysis to determine/rank other alternative scaling events. However, this further analysis can be viewed as discarding the work performed to arrive as the previously selected scaling event that could be implemented but for the lack of the additional processing instance. As such, in an alternative example embodiment, the scaling event can be deferred rather than discarded, e.g., deferred until the additional processor becomes available, the OES environment undergoes further evolution, workloads further change, etc. In this embodiment, communication of OESTMI 334 can correspondingly be deferred. Deferral can avoid wasting already performed work involved in arriving at the selection of the previous scaling event. Moreover, where a condition triggering deferral of committing the scaling event resolves, the deferral can be withdrawn and the scaling event can be committed. As an example, where the additional processing instance is added, the deferred scaling event can be converted to a committed scaling event, e.g., OESTMI 334 can be communicated to facilitate committing the scaling event. In an example embodiment, the deferred scaling event can be treated as a virtual scaling event, e.g., preserving the scaling event information while the scaling event remains uncommitted to the OES, and can be employed in determining subsequent scaling events.

As is noted herein, a virtual scaling event can be converted to a committed scaling event when a condition triggering deferral is resolved. Moreover, the virtual scaling event can be employed in determining further scaling events. In one or more embodiments, this can enable scaling to proceed from an initial topology to a subsequent topology based on an interim topology corresponding to the virtual scaling event, e.g., an OES can go from state A directly to state C based in part on a virtual state B, wherein state B reflects the virtual scaling event that was not committed to the OES. Continuing the previous example of the growing company, where the first scaling is deferred because the processing resource did not become available and where the example company continues to grow, perhaps to an international level, further topological alterations can be determined, based in part on the deferred scaling event, via stream topology component 320 to allow the OES to bypass committing the deferred scaling event and to go from the initial topology to next topology based in part on the deferred scaling event information, e.g., the deferred scaling event can be a virtual scaling event facilitating determination of a subsequent scaling event that can be committed as the next topology of the OES for the example company at the international business level. Moreover, a first deferred scaling event can support one or more other deferred scaling events, e.g., an OES from an initial state, e.g., state A, can undergo one or more deferred scaling events, e.g., (b) to (f), etc., before committing a then subsequent scaling event leading to a next OES topology, e.g., state G, such that an example OES at state A→virtual state (b)→virtual state (c)→virtual state (d)→virtual state (e)→virtual state (f)→OES at state G.

In one or more embodiments, an OES topology 302 can be depicted, for example, according to key space of segment(s) in time. For simplicity, OES topology 302 can be referred to as OES topology 302 or less accurately, but more conveniently, OES 302, or other similar terms. As is illustrated in OES topology 302, loading of a segment can be uneven, for example, in OES topology 302 the demand on computing resources "L" is illustrated as originating from events with keys between zero and 0.25. In this regard, there can be little loading of the OES segment prior to t1 from events between 0.25 and 1.0 of the key space. In an example embodiment, bifurcation of the example OES segment in epoch 340, e.g., up to t1, into two segments starting at t1 in epoch 342 can be ineffective at distributing the demand on computing resources. The scaling to add a segment can be associated with add computing resources, however the computing resources added for the new segment from 0.5 to 1.0 in epoch 342 does not alleviate the load occurring between zero and 0.25. Similarly, further bifurcation at epoch 344 can be regarded as ineffective at distributing work related to load L. In an example embodiment, OES scaling component 370 can determine that said scaling events are to be deferred and indicate that they be treated as virtual scaling events, whereby epochs 342 and 344 can be regarded as virtual epochs that are not actually implemented in OES 302 but can be employed in determining further scaling events.

In this example, epoch 346 can distribute loads L based on scaling that bifurcates the key space between zero and 0.25 into two segments beginning at t3, e.g., a first segment corresponds to events with keys from zero to 0.125 and a second segment can correspond to events with keys from 0.125 to 1.0. It can also be observed that virtual epoch 342 can be in part based on epoch 340, that virtual epoch 344 can be in part based on virtual epoch 342, and that epoch 346 can be based in part on virtual epoch 344, e.g., epoch 340→virtual epoch 342→virtual epoch 344→epoch 346. The transition from epoch 340 to epoch 346 can therefore be based on determining a first scaling event corresponding to causing epoch 342, determining to defer the first scaling event, determining a second scaling event based on the deferred first scaling event, further determining to also defer the second scaling event corresponding to epoch 344, determining a third scaling event corresponding to epoch 346 based on the deferred second scaling event, and causing scaling from the epoch 340 to epoch 346 as a result of committing the third scaling event. This scaling from epoch 340 to 346, although based in part on the deferred scaling events corresponding to epochs 342 and 344, can occur without implementing epochs 342 and/or 344 in OES topology 302.

In example OES topology 302, it can be desirable to determine if the scaling event can be expected to provide a desired level of benefit before committing resources to perform adaptation of an OES topology, e.g., OES scaling component 370 can determine deferring committing the scaling event. In an example embodiment, stream topology component 320 can receive measurements relating to, or can measure, load produced by an $i^{th}$ segment of an OES, e.g., via OES characteristics(s) 330 and/or system KPI(s) 332, etc. The load produced by the $i^{th}$ segment can be denoted $L_i$. It can be understood that an event stream storage system can scale an OES, or portion thereof, e.g., a segment, when the segment load exceeds some predefined threshold, as has been previously disclosed. However, the range of keys can be analyzed for two sub-ranges to measure and determine the load independently for of the two sub-ranges, e.g., $L_i^1$ and $L_i^2$, where $L_i^1+L_i^2=L_i$. As such, when $L_i$ transitions a threshold level, e.g., the load on the $i^{th}$ segment is sufficiently high to warrant considering a scaling event, the two subranges can be determined and analyzed before committing to the scaling event or deferring the scaling event. Returning to example 302, the high load in the first segment before t1 can cause stream topology component 320 to determine $L_i^1$ and $L_i^2$ where $L_i^1$ covers the key space from 0 to 0.5 and $L_i^2$ covers the key space from 0.5 to 1.0. In an example embodiment, $L_i^1$ and $L_i^2$ can represent a possible alternate OES topology, e.g., a topology with two segments resulting from possibly scaling one segment of an OES, wherein the topology scaling employs equal sized and complementary scaled segments. The load of these two sub-ranges can be analyzed before committing the scaling to determine if they will achieve the desired result, e.g., will satisfy a scaling rule. In an example embodiment, where the scaling will not satisfy the scaling rule, an alternate scaling can be selected. However, where the scaling is a preferred scaling, e.g., alternate scalings are lesser ranked or are otherwise less preferred scalings, and wherein the scaling also does not satisfy the scaling rule, OES scaling component 370 can defer committal of the scaling event to the OES.

Determining satisfaction of the scaling rule can, for example, be based on a selectable improvement threshold value. The selectable improvement threshold value can be denoted as 'SITV,' such that scaling up is permitted where $max(L_i^1, L_i^2)<(1-SITV)*L_i$. For example, if SITV is 0.3, e.g., 30%, then scaling up is enabled only when it assures per-segment load reduction by at least 30%. Where, in this example, there is not at least a 30% reduction in per-segment load, scaling up can be blocked because it would give too small effect. It is noted that other values of SITV can be selected or determined. In one or more embodiments, this scaling pre-check, if applied to example 302 where conventional complementary and equal key space sized sub-ranges are selected, would have prevented scaling of the system because there would have been no notable improvement in the per segment load as is noted hereinabove where the scaling was not effective for example 302. However, in an example embodiment, the sub-ranges can be complementary but other than equal in size, as an example, $L_i^1$ and $L_i^2$ can be selected where $L_i^1$ covers the key space from 0 to 0.05 and $L_i^2$ covers the key space from 0.05 to 1.0. In some instances, this dissimilar size can allow for beneficial bifurcation. In an example embodiment, dissimilar sized $L_i^1$ and $L_i^2$ can represent a possible alternate OES topology. Moreover, in one or more embodiments, there can be more than two sub-ranges that can be 'complementary' and can be equal or different in in size, as an example, $L_i=L_i^1+L_i^2+L_i^3$, where a covers the key space from 0 to 0.10, $L_i^2$ covers the key space from 0.10 to 0.20, and $L_i^3$ covers the key space from 0.20 to 1.0, and where $max(L_i^1, L_i^2, L_i^3)<(1-SITV)*L_i$. In an example embodiment, $L_i^1$, $L_i^2$, and $L_i^3$ can represent another possible alternate OES topology, e.g., a topology with three segments. In some instances, scaling with more than two sub-regions can allow for beneficial scaling of the OES.

As another example, determining satisfaction of the scaling rule can be based on an ability to implement the scaling event. In this example, the selected scaling can otherwise satisfy selection criteria and be desirable to commit to the OES, however, implementing the scaling event can be frustrated by other factors that can be compensated for via deferring the committing of the selected scaling event. As an example, a scaling event leading to epoch 346 can achieve distribution of load L and can be desirable to implement, however, if computing resources to implement the scaling event are not available, OES scaling component 370 can defer the scaling to epoch 346. Accordingly, where the computing resources become available, the deferral can be withdrawn and the scaling event can be committed. Alternatively, if load L is truncated, e.g., the environment of the OES evolves to not include load L, then the deferred scaling event can be discarded as being superfluous, e.g., the scaling to epoch 346 was deferred to a time when the scaling became unneeded.

Figure 4:
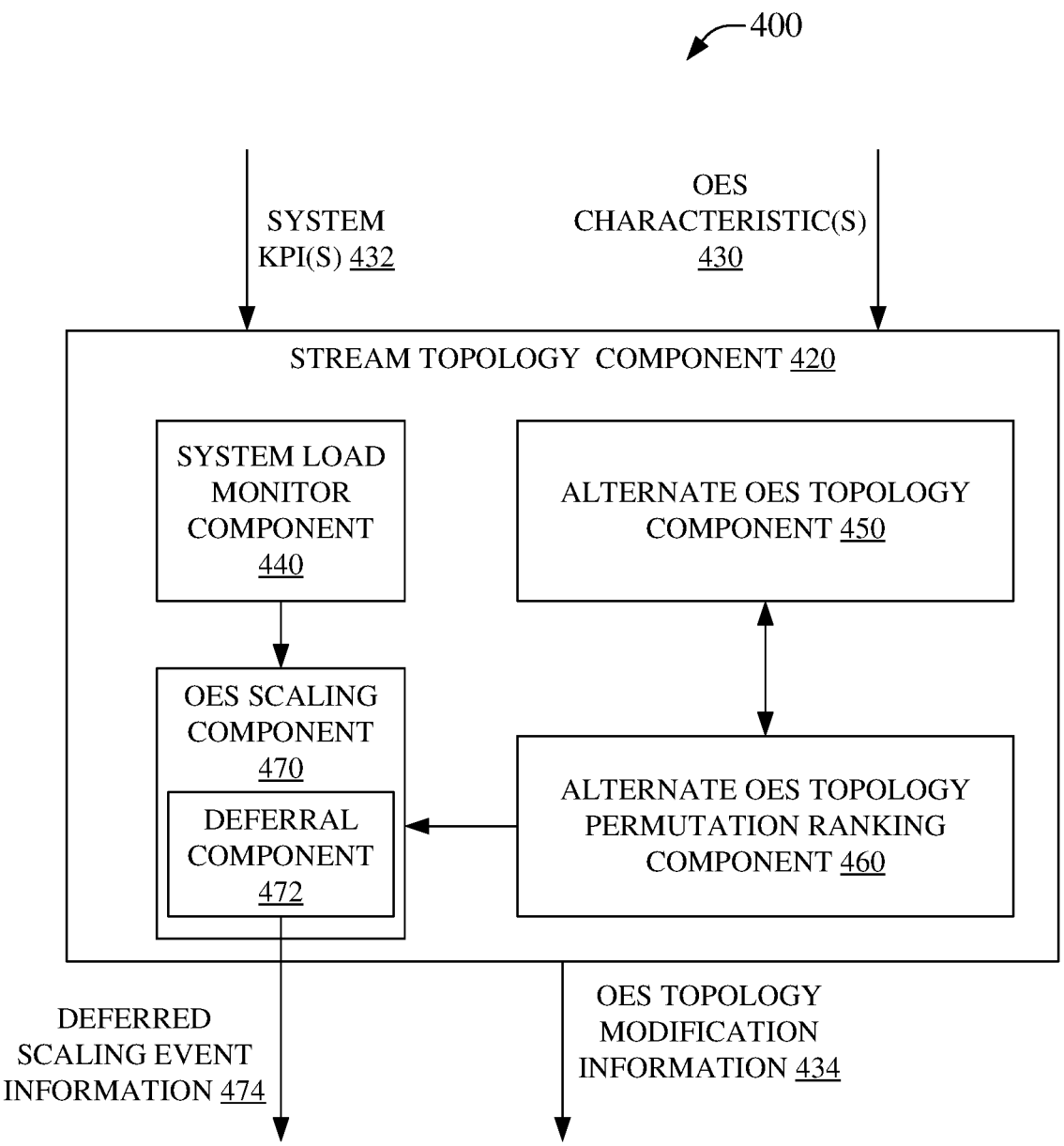
FIG. 4 is an illustration of an example system that can enable deferred scaling of an ordered event stream based on an alternate OES topology, in accordance with one or more embodiments of the subject disclosure.

FIG. 4 is an illustration of a system 400 that can enable deferred scaling of an ordered event stream based on an alternate OES topology, in accordance with one or more embodiments of the subject disclosure. System 400 can comprise stream topology component 420 that can receive information relating to an OES and/or KPIs of a OES storage system, e.g., current OES characteristic(s) 430, system KPI(s) 432, etc. Current OES characteristic(s) 430, for example, can comprise a topology of an OES, a current work load of an OES, a current performance of an OES, historical information for the OES such as historical work load(s), historical performance, etc. System KPI(s) 432, for example, can comprise processing instance performance indicators, historical processing instance performance indicators, availability of additional performance instance(s) and/or corresponding performance indicators, etc. Stream topology component 420 can generate OESTMI 434 that can facilitate altering a topology of an OES, e.g., scaling an OES or portion thereof. Stream topology component 420 can comprise system load monitor component 440 that can monitor a load of a segment(s) of an OES, e.g., e.g., can receive measurements relating to, or can measure, load produced by an $i^{th}$ segment of an OES, e.g., via OES characteristics(s) 430 and/or system KPI(s) 432, etc.

Alternate OES topologies can be determined via alternate OES topology component 450, e.g., based on OES characteristics(s) 430 and/or system KPI(s) 432, etc. These alternate topologies can be analyzed by alternate OES topology permutation ranking component 460, hereinafter ranking component 460 for simplicity. In one or more embodiments, ranking component 460 can, in some embodiments, determine a load on a possible alternate topology segment(s), e.g., a load on an alternative segment having a sub-range of keys, e.g., $L_i^1$, $L_i^2$, etc. Alternate topologies can be determined via alternate OES topology component 450 and analyzed via ranking component 460 before committing to a scaling event. The load of these sub-ranges can be analyzed, for example, to determine if they will achieve a desired result, e.g., will satisfy a scaling rule, for example, $\max(L_i^1, L_i^2, \text{etc.}) < (1-\text{SITV})*L_i$.

At alternate OES topology component 450, $L_i$ can be divided into n segment parts ($L_i^1 \ldots L_i^n$) and these segment parts can be combined into different alternate topologies, e.g., topological permutations. As an example, an initial segment can be divided in to n=8 parts and a first alternate topology can comprise two segments, SA and SB, where SA comprises parts 1 to 4 while SB can comprise parts 5 to 8. In this example a second alternate topology can comprise two segments, SC and SD, where SC comprises parts 1-3 and SD comprises parts 4-8. Yet a third alternate topology in this example can comprise three segments, SE, SF, and SG, where SE comprises parts 1-2, SF comprises parts 3-7, and SG comprises part 8. As will be appreciated, the n parts can be combined in various permutations that can comprise different numbers of segments of the same and/or different sizes while still providing full coverage for the key space.

The alternate OES topologies determined via alternate OES topology component 450 can then be analyzed via alternate OES topology permutation ranking component 460, for example, to determine if they satisfy a scaling rule, to determine loading of segments comprising an alternate topology, etc. The several alternate topologies can then be scored and/or ranked. As an example, a first alternate topology can be predicted to yield a 50% reduction in work load, a second alternate topology can be predicted to yield a 30% reduction in work load, and a third alternate topology can be predicted to yield a 0% reduction in work load, whereby the ranking, for example, can favor the 50% reduction and least favor, or even eliminate, the 0% reduction. As a further example, such as where three segments will result from scaling of an initial segment, the ranking, for example, can perform a first ranking according to a work load reduction between two of the three segments and then perform a second ranking according to another work load reduction between the remaining two of the three segments. In this example, splitting into two segments can result in each segments taking about 50% of the work, where then SITV=0.5. However splitting into: 1) three equal sized complementary segments can result in each segment taking about 33% of the work, where then SITV=0.66, 2) three unequal sized complementary segments with a first segment taking 50% (SITV=0.5), a second segment taking 25% (SITV=0.75), and a third segment taking 25% (SITV=0.75), and 3) three unequal sized complementary segments with a first segment taking 50% (SITV=0.5), a second segment taking 30% (SITV=0.7), and a third segment taking 20% (SITV=0.8). The ranking of the three alternate topologies with three segments can result in ranking the first alternate higher based on the (SITV=0.66>SITV=0.5), then the second alternate where the first segment SITV=0.5 is the same as the third alternate first segment, but the second alternate second segment has an SITV=0.75 that is greater than the third alternate second segment of 0.70. One of skill in the art will appreciate that there are nearly an unlimited number of way to rank the permutations and that all such ranking techniques are asserted as being within the scope of the instant disclosure even where not explicitly recited for the sake of clarity and brevity. It is further noted that the rankings can inherently reflect asymmetric loading of a portion of the initial key space, e.g., $L_i^1$ can be experiencing a different load than other portions of the key space, $L_i^2 \ldots L_i^n$, and, as such, computed scores can comprise this difference in load at each of the n portions of the initial segment key space. Returning to example 302, the load on key=0.08 can be much greater than the other portion of the segment and scoring and/or ranking can therefore inherently reflect this asymmetric loading of the initial segment key space, e.g., the load for the sub-range comprising 0.08 will be the same as for the initial segment because no other part of the initial segment is indicated as demanding work.

In one or more embodiments, the ranking can also include monetary or other costs of instantiating additional processing instances. As can be appreciated by one of skill in the art, given free and unlimited computer resources, it can be possible to have every portion of the key space allocated to a separate segment with its own processing instance because this can result in the greatest improvement over having more limited resources serving a segment that covers a greater portion of the key space. However, computing resources come at a cost, including greater monetary and other expenses such as additional space for the components, more maintenance, increased storage system complexity, etc. Generally, use of fewer computing resources can be therefore desirable. The ranking can reflect monetary and other costs of additional processing instances to afford balance to how many additional segments are to be created and supported by one or more additional processing instance. Returning to the above example, it can be more favorable, e.g., higher ranked, to use two segments, rather than three segments to scale up a burdened segment, so long as the two segments provide satisfactory levels of performance. In some embodiments, cost information can be comprised in system KPI(s) 432. The cost can, in some embodiments, reflect different costs for different processing instances, for example, where a first processing instance employs a low cost, mainstream, processor and a second processing instance employs a high cost, state of the art processor, an alternate topology employing the lower cost processor can have an increased rank over a similar topology employing the higher cost processor.

OES scaling component 470 can receive ranking, scores, etc., via alternate OES topology permutation ranking component 460, loading via system load monitor com 440, etc., and can select an alternate topology, if one exists that can satisfy the scaling rule. This alternate topology can then be facilitated via generation of OES topology modification information 434. Moreover, OES scaling component can comprise deferral component 472 that can facilitate deferring the committing of an OES scaling event, e.g., OES scaling component 470 can select a preferred scaling event based on first criteria, e.g., ranking of possible scaling events, etc., and can further determine that a scaling event can is to be deferred based on second criteria, for example, lack of available computing resources to implement a selected scaling event, a change in an OES environment obviating an impetus to perform a scaling event, etc. Where OES scaling component 470 can determine that a scaling event is to be deferred, deferral component 472 can generate deferred scaling event information 474 that can preserve information corresponding to the scaling event being deferred, e.g., the deferred scaling event information 474 can facilitate treating the scaling event as a virtual scaling event that is not committed to the OES but also preserves the scaling event information in a manner that can enable converting the virtual scaling event into a committed scaling event, determining a subsequent scaling event based on the virtual scaling event, etc. In an example embodiment, deferred scaling event information 474 generated by deferral component 472 can be based on, and preserve, a selected alternate OES topology for a scaling event in a manner that reduces the need to recompute and/or redetermine the selected alternate OES topology, e.g., this reduces wasting of computing resources expended in analyzing/selecting the alternate OES topology that was then deferred. In an embodiment, deferred scaling event information 474 can be stored via an OES, for example, as an event in the OES corresponding to the deferred scaling event, via another OES corresponding to the OES storage system, etc. In some embodiments, deferred scaling event information 474 can be stored via a local memory or storage device, via a memory or storage device located remotely from OES scaling component 470, etc.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more processes, operations, acts, etc. herein described. It should be further appreciated that the example methods disclosed throughout the subject specification are capable of being stored on an article of manufacture (e.g., a non-transitory computer-readable medium) to allow transporting and transferring such methods to computers for execution, and thus implementation, by a processor or for storage in a memory.

Figure 5:
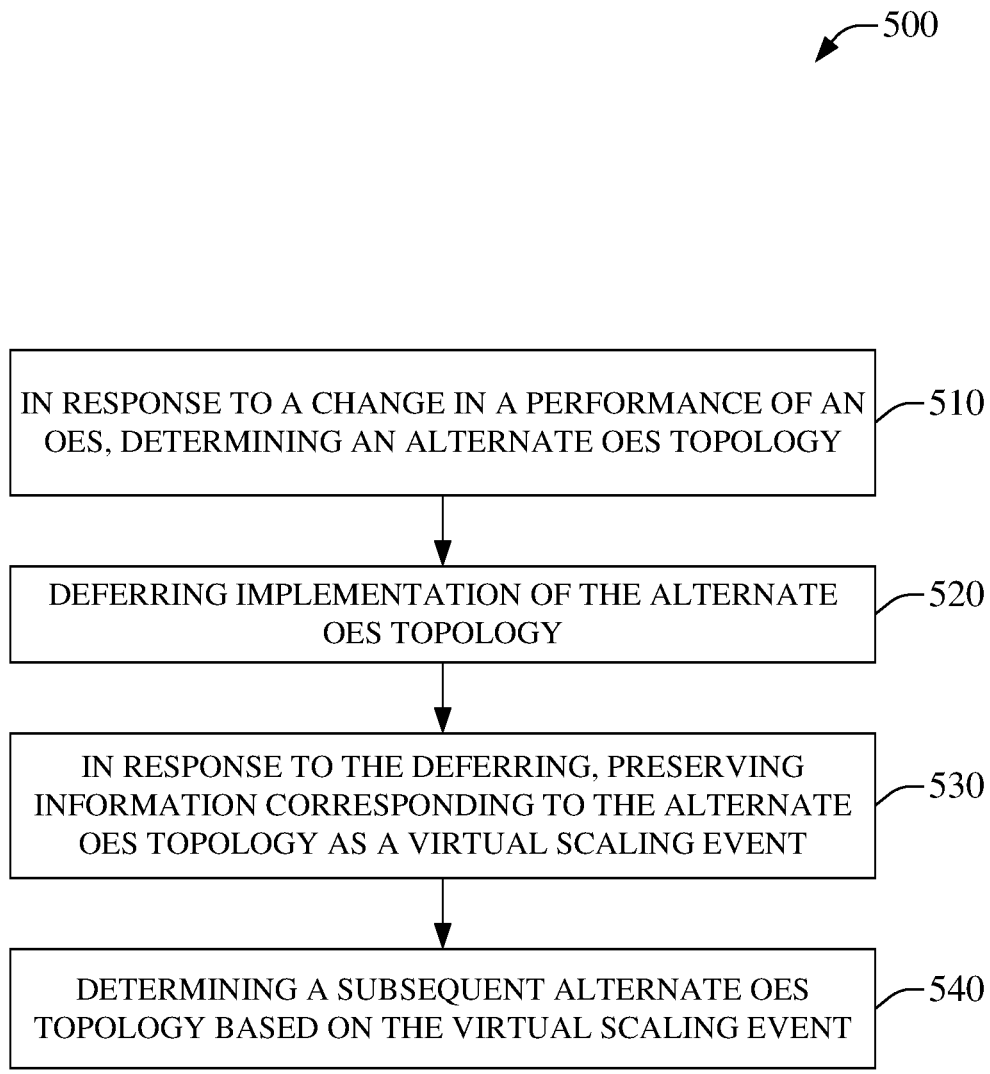
FIG. 5 is an illustration of an example method enabling deferred scaling of an ordered event stream, in accordance with one or more embodiments of the subject disclosure.

FIG. 5 is an illustration of an example method 500, which can facilitate deferred scaling of an ordered event stream, in accordance with one or more embodiments of the subject disclosure. Method 500 can comprise determining an alternate OES topology, for example, a topology that scales the OES or a portion thereof. The alternate OES topology can be determined in response to a change in performance of the OES. The change in performance of the OES can be exemplified in a change in consumption of computing resources by one or more portions of the OES, e.g., a segment of an OES can undergo an increase/decrease in reads/writes to the segment, whereby the segment can be regarded as being subject to a changed load. Scaling of the segment can result in reducing loading of a segment by dividing the loaded segment into two or more segments that can each access computing resources, e.g., a scaling event can result in increasing an amount of computing resources that can be employed for events in a range of keys by dividing the range of keys such that the combination of subsequent smaller key ranges can access more computing resources than were accessible by the initial range of keys. Conversely, underutilized computing resources can be merged via a scaling event, which can result in more efficient use of computing resources. As an example, for each processing instance there can be X units of computing resource overhead consumed such that it can be desirable to reduce the number of processors to reduce the sum of the X units, for example, where a processor can perform Y+X units of work, then where the amount of work to be performed is 0.5Y, use of one processor can consume 0.5Y+X units of work while using five processors each taking 0.1 units of work can consume 5(0.1Y+X)=0.5Y+5X units of work. In this example, it can be more efficient to use only the one processor and correspondingly one segment rather than five segments. However, where there is 1.5Y units of work to perform, then (Y+X)<1.5Y+X, e.g., a single processor would be overburdened, then it can be desirable to scale to two segments and correspondingly two processors where X<0.5Y, such that for example, each can then consume (1.5Y/2)+X=0.75Y+X. In this example, the scaling can result in increasing the work to be performed by X, but it can also resolve the overburdening of one processor.

Method 500, at 520, can comprise deferring implementation of the alternate OES topology. In one or more embodiments, determining an alternate OES topology can be distinct from committing a scaling event based on the determined alternate OES topology, e.g., a scaling event can be deferred. In one or more embodiments, an OES storage system can be implemented in a computing environment that can access to scalable amounts of computing resources, for example, a data center than can provide additional processing instances to an OES storage system. Accordingly, in some embodiments, determining an alternate OES topology can be based on an assumption that computing resources can be readily available, e.g., if scaling is desirable then computing resources will be accessible to achieve the determined alternate OES topology. However, circumstances can be other than the assumed and alternate amounts of computing resources may not be available, either now or in the future. As such, an alternate OES topology for a scaling event can be determined only to find out that the computing resources to implement the scaling event are not available at that moment. In these circumstances, rather than just dumping the cost of determining/selecting the alternate OES topology as infeasible to implement, the implementation of the alternate OES topology can be deferred, e.g., the scaling of the OES can be deferred.

In one or more embodiments, deferring the implementation of the alternate OES topology can trigger preserving corresponding information at 530 of method 500. In an example embodiment, this can be viewed as supporting virtualization of the scaling event, e.g., the scaling event may not actually be implemented in the OES storage system, but rather, the OES storage system can preserve, store, save, etc., information corresponding to the alternative OES topology, e.g., rather than merely discarding the results of determining/selecting the alternate OES topology, such that implementing the scaling event can be deferred. As an example, in FIG. 2, after t1 and before t2, an alternate OES topology reflecting epoch 2 can be determined to be desirable but can be deferred. Accordingly, in this example, information can be stored that can later be employed to commit a scaling event that can result in an OES topology corresponding to epoch 2. The example OES storage system can treat the deferred alternate OES topology as a virtual scaling event and, for example, can map event operations that would have occurred in segment 5, if the scaling had been committed, to occur in segment 1. In one or more embodiments, a condition that resulted in the deferring of the scaling event can be resolved, for example, additional computing resources can eventually become available, etc. In the current example, at t2, the condition for deferral can be resolved and the virtual scaling event can be retrieved and converted to a committed scaling event, e.g., at t2 epoch 2 can begin according to the previously determined and deferred alternate OES scaling as described for this example.

In one or more embodiments, the environment of the OES storage system can change prior to resolving a condition triggering deferral of a scaling event. As an example, committing an alternate OES topology can be deferred due to a lack of available additional computing resources. In this example, the performance of the OES can continue to change in time. It can be appreciated that the example performance change can evolve to a point where the deferred scaling event can be an inappropriate solution, e.g., the appropriateness of a deferred scaling event can be time sensitive where demands on an OES storage system can fluctuate. As such, at 540, method 500 can comprise determining a subsequent alternate OES topology. At this point, method 500 can end. The noted subsequent alternate OES topology can leverage a previously determined alternate OES topology because corresponding information can have been preserved at 530. As such, at 540, the subsequent alternate OES topology can be based, at least in part, on the virtual scaling event. Returning to the above example, where a virtual scaling event is stored for epoch 2, e.g., epoch 2 is a virtual epoch, then EOS operations are performed via epoch 1 topography even after t2. However, where sometime after t2 and before t3 performance of the OES storage system continues to evolve, virtual epoch 2 can be employed to determine a subsequent alternate OES topology, for example as embodied in epoch 3. Accordingly, where, for example, there can be sufficient computing resources to implement epoch 3 but insufficient to implement epoch 2, the OES can undergo scaling at t3 from epoch 1 directly to epoch 3 based on virtual epoch 2. This can demonstrate that a virtual scaling event can be stored to facilitate determining subsequent scaling events. In an example embodiment, more than one level of alternate OES topologies can be chained together. In this regard, there can be more than one layer of virtual scaling events between any two committed scaling events, for example, in FIG. 3, scaling from epoch 340 can be to epoch 346 via virtual epoch 342 and virtual epoch 344, e.g., committed 340→virtual 342→virtual 344→committed 346, such that 346 can be said to be based on 344 that can be said to be based on 342 that can be said to be based on 340.

Figure 6:
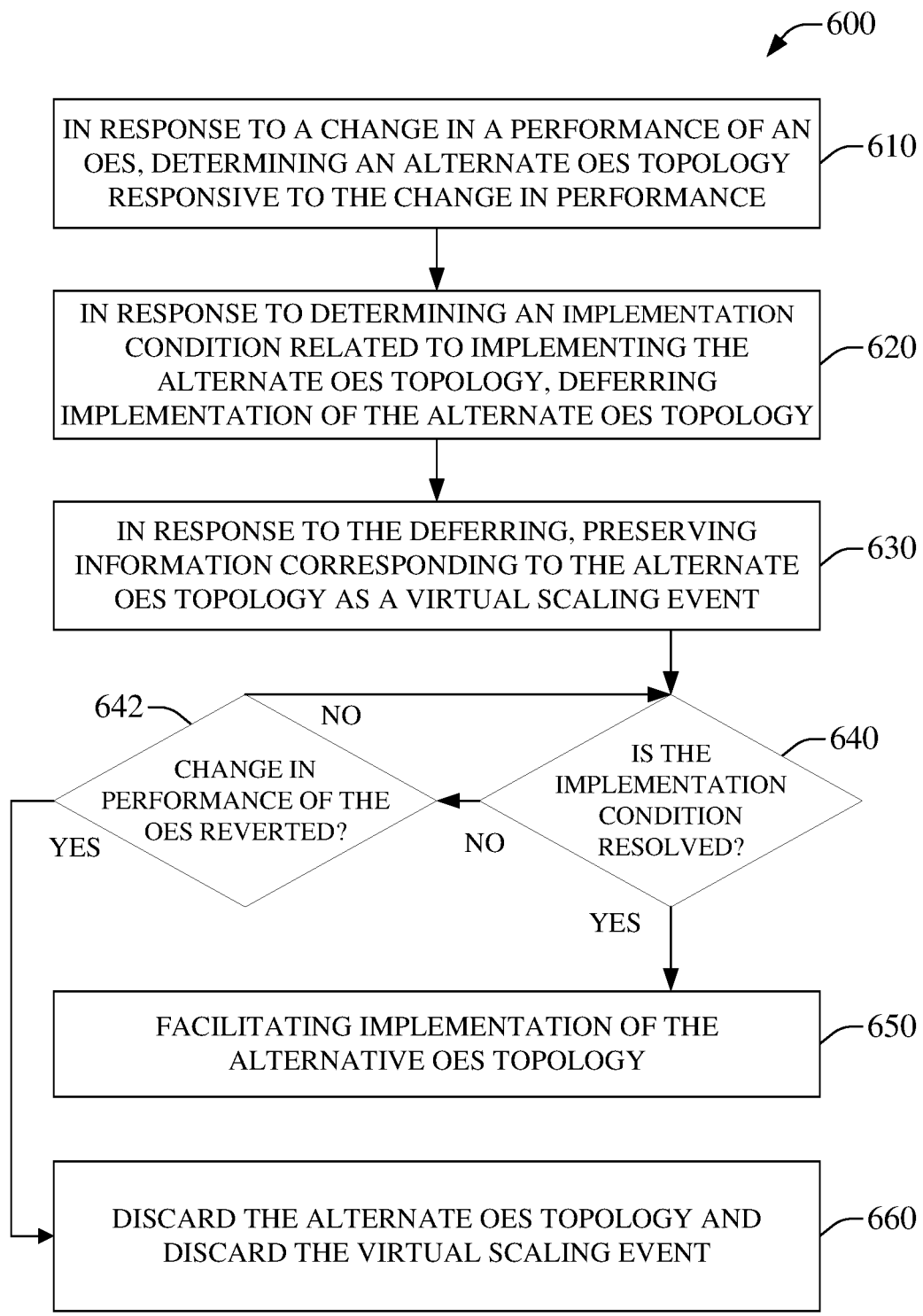
FIG. 6 is an illustration of an example method enabling resolving deferred scaling of an ordered event stream based on a selectable scaling event, in accordance with one or more embodiments of the subject disclosure.

FIG. 6 is an illustration of an example method 600, which can facilitate resolving deferred scaling of an ordered event stream, in accordance with one or more embodiments of the subject disclosure. Method 600 can comprise determining an alternate OES topology in response to a change in OES performance. In an example embodiment, the alternate OES topology can be responsive to the change in OES performance. As an example, where a change in performance of the OES can indicate that additional computing resources can be beneficial, an alternate OES topology can scale to increase a count of segments that can correspond to an increase in an amount of computing resources useable by the OES storage system. As another example, where a change in performance of the OES can indicate that fewer computing resources can be beneficial, an alternate OES topology can scale to decrease a count of segments that can correspond to a decrease in an amount of computing resources useable by the OES storage system which, for example, can reduce overhead computing resource consumption and can enable the OES storage system to operate more efficiently.

Method 600, at 620, can comprise deferring implementation of the alternate OES topology. The deferring can be in response to determining an occurrence of an implementation condition, e.g., a condition related to implementing the alternate OES topology can occur, for example, the alternate OES topology can correspond to adding computing resources that can be presently unavailable, etc. Where the example computing resources are presently unavailable, implementing the alternate OES can fail. Accordingly, rather than discarding the results of method 600 at 610, the implementation of the alternate OES topology can be deferred. Although not illustrated for clarity and brevity, it will be appreciated that not determining an implementation condition at 620 can result in implementation of the alternate OES topology from 610, etc., e.g., where there is no implementation condition determined, there can be no cause for deferring the committing of the scaling event to effect the alternate OES topology in the OES storage system.

In an example embodiment, deferring the implementation of the alternate OES topology by method 600 can correspond to preserving information corresponding the alternate OES topology at 630. In an example embodiment, the preservation can act as a virtual scaling event, e.g., the scaling event may not actually be implemented/committed in the OES storage system, and rather the OES storage system can preserve, store, save, etc., information corresponding to the alternative OES topology to enable mapping of operations in a virtually scaled OES to act according to a previously committed OES topography, e.g., operations directed at a virtual epoch can be mapped to a last committed epoch.

It can be appreciated that the implementation condition can continue or can be resolved. As such, at 640, method 600 can comprise determining if the implementation condition is resolved. Resolution of the implementation condition can be associated with permitting the deferred scaling event, e.g., the virtual scaling event, to be converted to a committed scaling event. As an example, an alternative OES topology can indicate that a processor instance is to be added, however a processor instance may not be presently available, which can result in virtualizing the scaling event to defer the implementation of the alternate OES topology. In this example, the additional processor instance can later become available. Accordingly, the implementation condition, e.g., lack of the additional processor, can be resolved. As such, method 600 can advance to 650 and implementing the alternative OES topology can be facilitated, e.g., now that the extra processor is available the OES scaling can be committed. At this point method 600 can end.

Where the implementation condition remains unresolved at 640, method 600 can advance to 642 and can comprise determining if the change in performance from 610 has reverted, e.g., has the change in performance that caused determining the alternative OES topology abated, returned to a level of change that does not trigger the determining the alternate OES topology, etc. As an example, where an OES storage system experiences an increased workload and defers a corresponding scaling event to wait for additional computing resources, then continues to defer the scaling event because the additional computing resources remain absent, where the increased workload diminishes, the need for the scaling event can also diminish to a point that the alternate OES topology can be discarded at 660. Moreover, storage of information corresponding to the alternative OES topology, e.g., the virtual scaling event, can also be discarded at 660. At this point method 600 can end. It can be observed that method 600 can loop while the implementation condition remains unresolved and while the change in performance does not revert. In this regard, method 600 can continue to retain the virtual scaling event until either the virtual scaling event can be committed and thereby be converted to an implemented scaling event, or until the virtual scaling event is no longer relevant, for example, due to the change in performance reverting to a pre-virtual scaling event point.

Figure 7:
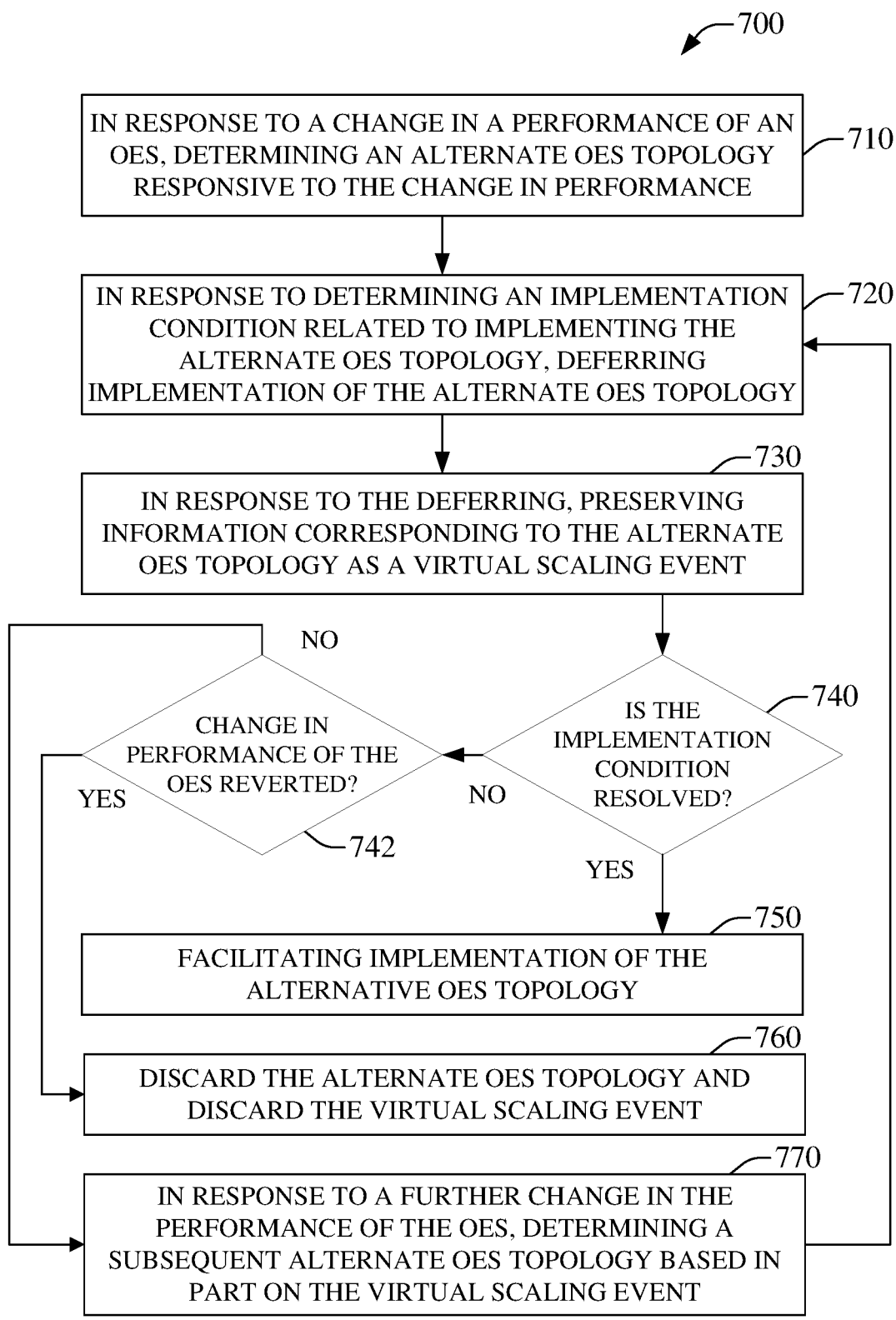
FIG. 7 is an illustration of an example method facilitating iterative deferring of scaling in an ordered event stream, in accordance with one or more embodiments of the subject disclosure.

FIG. 7 is an illustration of an example method 700, which can facilitate iteratively deferring scaling of an ordered event stream, in accordance with one or more embodiments of the subject disclosure. Method 700 can comprise determining an alternate OES topology in response to a change in OES performance. In an example embodiment, the alternate OES topology can be responsive to the change in OES performance. As an example, where a change in performance of the OES can indicate that additional computing resources can be beneficial, an alternate OES topology can scale to increase a count of segments that can correspond to an increase in an amount of computing resources useable by the OES storage system. As another example, where a change in performance of the OES can indicate that fewer computing resources can be beneficial, an alternate OES topology can scale to decrease a count of segments that can correspond to a decrease in an amount of computing resources useable by the OES storage system which, for example, can reduce overhead computing resource consumption and can enable the OES storage system to operate more efficiently.

Method 700, at 720, can comprise deferring implementation of the alternate OES topology. The deferring can be in response to determining an occurrence of an implementation condition, e.g., a condition related to implementing, or not implementing, the alternate OES topology can occur, for example, the alternate OES topology can correspond to adding computing resources that can be presently unavailable, etc. In this example, actual implementation of the alternate OES can fail, for example, because computing resources indicated in the scaling event for the alternate OES topology can be unavailable. Accordingly, implementation of the alternate OES topology can be deferred rather than merely discarding the results of method 700 at 710.

In one or more embodiments, deferring the implementation of the alternate OES topology can comprise preserving information corresponding the alternate OES topology at 730. In an example embodiment, the preservation can be a form of virtual scaling, e.g., virtual scaling may not actually be implemented/committed in the OES storage system and can enable translating OES operations between the topology of a virtual epoch and an previously committed epoch of the OES. As such, virtual scaling events can act to preserve, store, save, etc., information corresponding to an alternative OES topology of an OES, which preservation can enable mapping of operations between virtually and implemented OES topologies, later conversion of a virtual scaling event to a committed scaling event, etc.

At 740, method 700 can comprise determining if the implementation condition is resolved. Resolution of the implementation condition can be associated with permitting the deferred scaling event, e.g., the virtual scaling event, to be converted to a committed scaling event. As an example, an alternative OES topology can indicate that a processor instance is to be added, however a processor instance may not be presently available, which can result in virtualizing the scaling event to enable deferring the implementation of the alternate OES topology. In this example, the additional processor instance can later become available. Accordingly, the implementation condition, e.g., lack of the additional processor, can become resolved or can be regarded as being resolved. As such, method 700 can advance to 750 and implementing the alternative OES topology can be facilitated, e.g., now that the extra processor is available in the example, the OES scaling can be committed. At this point method 700 can end.

Where the implementation condition can remain unresolved at 740, method 700 can advance to 742 and can comprise determining if the change in performance related to 710 has reverted, e.g., has the change in performance that caused determining the alternative OES topology has abated, returned to a level of change that does not trigger the determining the alternate OES topology, etc. As an example, where an OES storage system experiences an increased workload and defers a corresponding scaling event to wait for additional computing resources, then continues to defer the scaling event because the additional computing resources remain absent, where the increased workload diminishes, the need for the scaling event can also diminish to a point that the alternate OES topology can be discarded at 760. Moreover, storage of information corresponding to the alternative OES topology, e.g., the virtual scaling event, can also be discarded at 760. At this point method 700 can end.

However, where the implementation condition can remain unresolved and where the change in performance can fail to revert, method 700 can advance to 770. This can be distinct from method 600 looping while the implementation condition remains unresolved and while the change in performance does not revert, e.g., looping between 640 and 642, etc. As such, method 700 can seek to employ the preserved information corresponding to the alternative IES topology at 770 to determine a subsequent alternate OES topology where there can be further change in the performance of the OES indicated. In this regard, where the OES has a first virtual scaling event and there occurs further change to the performance of the OES, the OES can undergo a second iteration of possible deferral, e.g., the first virtual scaling event can support to a second virtual scaling event via looping form 770 back to 720 and substituting the subsequent alternate OES topology for the alternate EOS topology and determining a corresponding implementation condition. Alternatively, the subsequent alternate OES topology can be implemented where a second implementation condition is not determined to be present. These examples can be considered in an embodiment of FIG. 3, where the first iteration though method 700 can lead to virtual epoch 342, then at 770, can lead to second virtual epoch 344, which via a third iteration through method 700 could lead to a third epoch 346, whereby implemented epoch 346 can be based on virtual epoch 344 that can be based on virtual epoch 342 that can be based on implemented epoch 340. Although not illustrated for clarity and brevity, it will be appreciated that not determining an implementation condition at 720 can result in implementation of an alternate OES topology, e.g., from 710, 770, etc.

Figure 8:
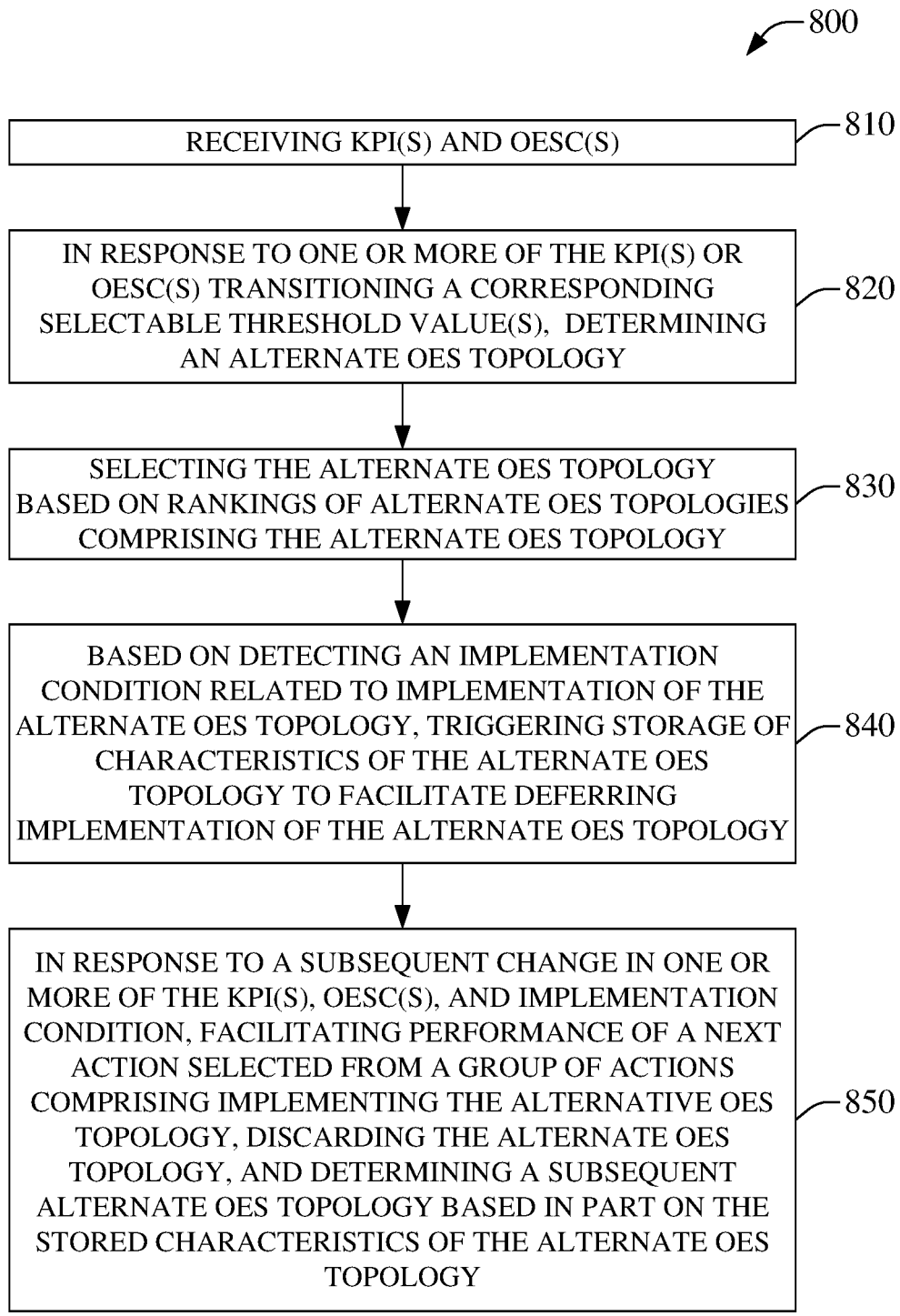
FIG. 8 is an illustration of an example method facilitating deferred scaling of an ordered event stream based on ranking alternate OES topologies, in accordance with one or more embodiments of the subject disclosure.

FIG. 8 is an illustration of an example method 800, which can enable deferred scaling of an ordered event stream based on ranking alternate OES topologies, in accordance with one or more embodiments of the subject disclosure. At 810, method 800 can comprise receiving an OES storage system KPI(s) and an OES characteristic (OESCs). Example OES characteristics can comprise a current computing resource demand, a count of segments comprising an OES, a distribution of work among the segments, a topology of an OES, a historical workload of one or more segments of an OES, etc. Example storage system KPIs can comprise resource loading of a processing instance, threshold values for current and/or available computing resources, etc.

At 820, method 800 can determine an alternate OES topology based on or more of the KPI(s) or OESC(s) being determined to transition a selectable threshold value. As an OES segment can be written to or read from, the load on computing resources, e.g., on a processing instance, etc., supporting the OES segment can be generated. As the number of operations on the OES segment increases, load can increase and, correspondingly, as the number of operations decreases, the load can decrease. In one or more embodiments, the complexity of the operation can also affect the load, e.g., writing/reading an event that has a low count of data bits can be less of a load than writing/reading an event that has a high count of data bits. As an OES segment load increases, it can begin to tax the supporting computing resources, e.g., processor, memory, network, etc., and, in some situations can exceed a threshold performance level of the supporting computing resources. As such, it can be desirable to alter the topology of the OES, e.g., scaling the OES to correspondingly alter the loading on computing resources corresponding to the related OES segment(s). As an example, an OES segment can be scaled, resulting in two or more new segments that can be less demanding on their associated processing instance, e.g., a loaded segment can be split into two or more less loaded segments which can each be supported by separate processing instances to preserve ordering of events in any new segments.

Where the alternate OES topology is determined at 820, method 800 can advance to 830 where the alternate OES topology can be selected from among alternate OES topologies based on rankings of the alternate OES topologies. In one or more embodiments, different OES topologies can be feasible but can be associated with different levels of performance and can accordingly be ranked against each other to enable selecting a preferred alternate OES topology, e.g., the alternate OES topology. As an example, the alternate OES topologies can represent permutations of n parts of the loaded OES segment, e.g., an $i^{th}$ segment of an OES having a load L that can be divided into n segment parts ($L_i^1 \ldots L_i^n$) and these segment parts can be combined into different alternate topologies, e.g., topological permutations, e.g., where n=2, $L_i = L_i^1 + L_i^2$. In some embodiments, $L_i^1$ and $L_i^2$ can be selected, for example, such that a covers the key space from 0 to 0.05 and $L_i^2$ covers the key space from 0.05 to 1.0. The load value can then be expressed as:

$$\frac{\sum_{j=1}^{m} L_i^j}{\sum_{j=m+1}^{n} L_i^j},$$

for a natural number in between 1 and n. As can be understood in method 800, in response to an indication that an OES segment is beginning to approach a demand for computing resources that can strain a corresponding processing instance, an alternate OES segment topography can be selected based on a rank of the alternate OES segment topography among other alternate OES segment topographies. In an embodiment, rank can be based on how well the alternate OES segment topography will balance the loads of the resulting new segments. In other embodiments, for example where available processing instances are not uniform, etc., the rank can be based on the how the processing instance corresponding to new segments will perform relative to each other. In some embodiment, for example where scaling can result in more than two new segments, the ranking can be more advanced as is disclosed elsewhere herein. Generally, an alternate OES segment topography should provide better than a selectable level of improvement to the loading of the processing instances.

At 840, method 800 can comprise triggering storage if characteristics of the alternate OES topology. The triggering can be based on detecting an implementation condition that can be related to implementation of the alternate OES topology, e.g., a condition can arise where implementation is infeasible, designated as delayed, etc., for example the alternate OES topology indicates use of an additional computing resource, but that computing resource is not presently available, thereby triggering storage of the alternate OES topology that can facilitate deferring implementation of the alternate OES topology, e.g., storing the alternate OES topology characteristics can enable later implementation of the of the alternate OES topology.

Method 800, at 850, can comprise facilitating performance of a next action in response to a subsequent change in one or more of the KPI(s), OESC(s), and/or implementation condition. In one or more embodiments, the next action can be selected from a group of actions comprising implementing the alternative OES topology, discarding the alternate OES topology, and determining a subsequent alternate OES topology based in part on the stored characteristics of the alternate OES topology. At this point method 800 can end. In one or more embodiments, the next action can convert the deferred scaling event, e.g., implement a virtual scaling event, into an implemented/committed alternate OES topology, for example where a computing resource can become available. In another embodiment, the next action can revert to a last implemented OES topology, for example, where a need for implementing the alternate OES topology is vacated. In a further embodiment, a subsequent alternate OES topology can be determined based on the stored alternate OES topology, for example, where the OES environment, e.g., KPI(s) and OESC(s) continue to evolve beyond the scope of the stored alternate OES topology.

Figure 9:
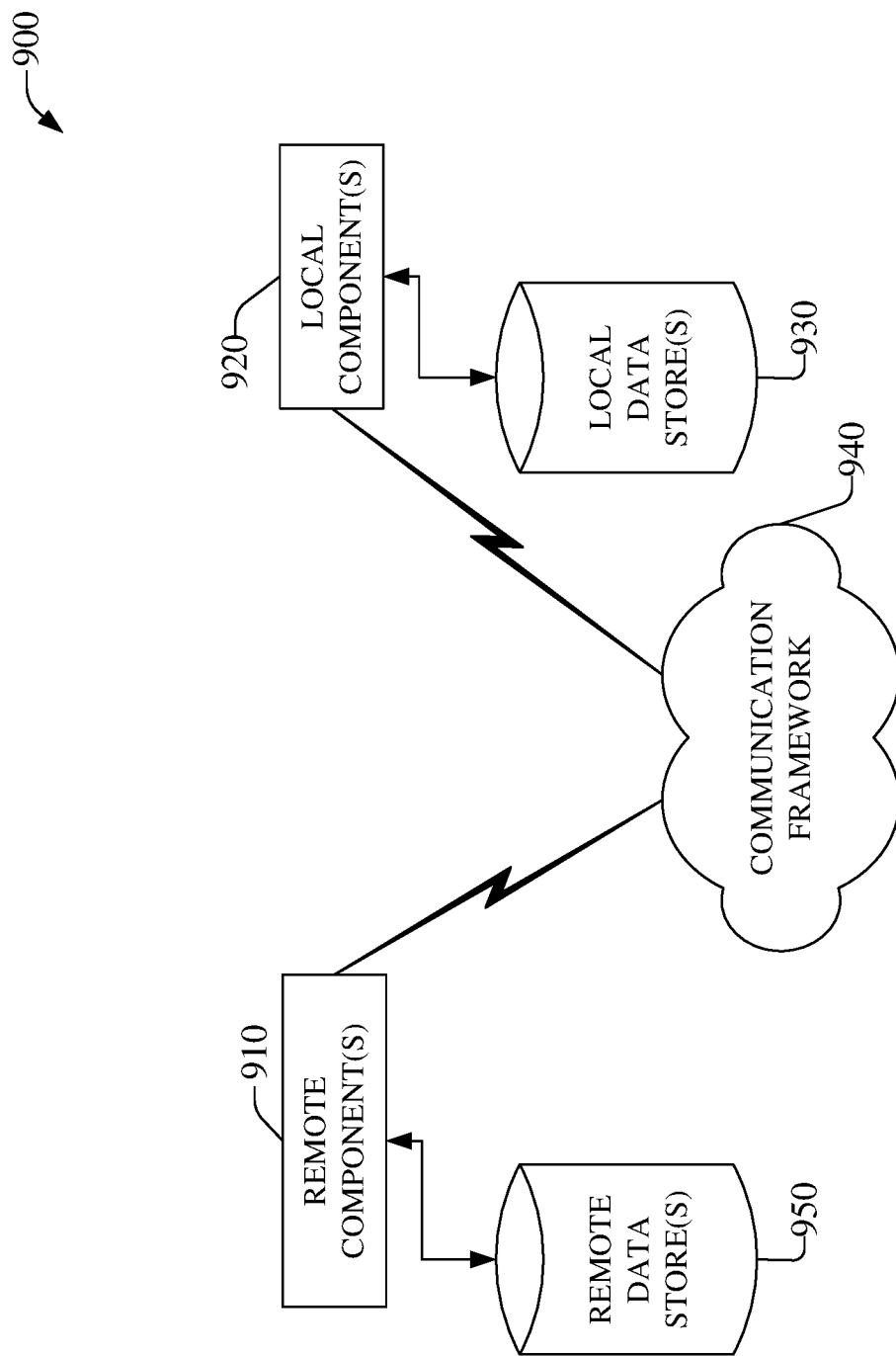
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, a remotely located processor device comprised in processor component 104, a remotely located device comprised in stream topology component 120, 320, 420, etc., connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, a processor device comprised in processor component 104, a device comprised in stream topology component 120, 320, 420, etc..

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, OESCs 330, 430, etc., system KPIs 332, 432, etc., write(s) 106, read(s) 107, OES topology modification information 334, 434, etc., can be communicated via communication framework 940 among components of an OES storage system 100, 200, 300, 400, etc., e.g., to facilitate adapting, altering, modifying, etc., a topology of an OES, as disclosed herein.

Figure 10:
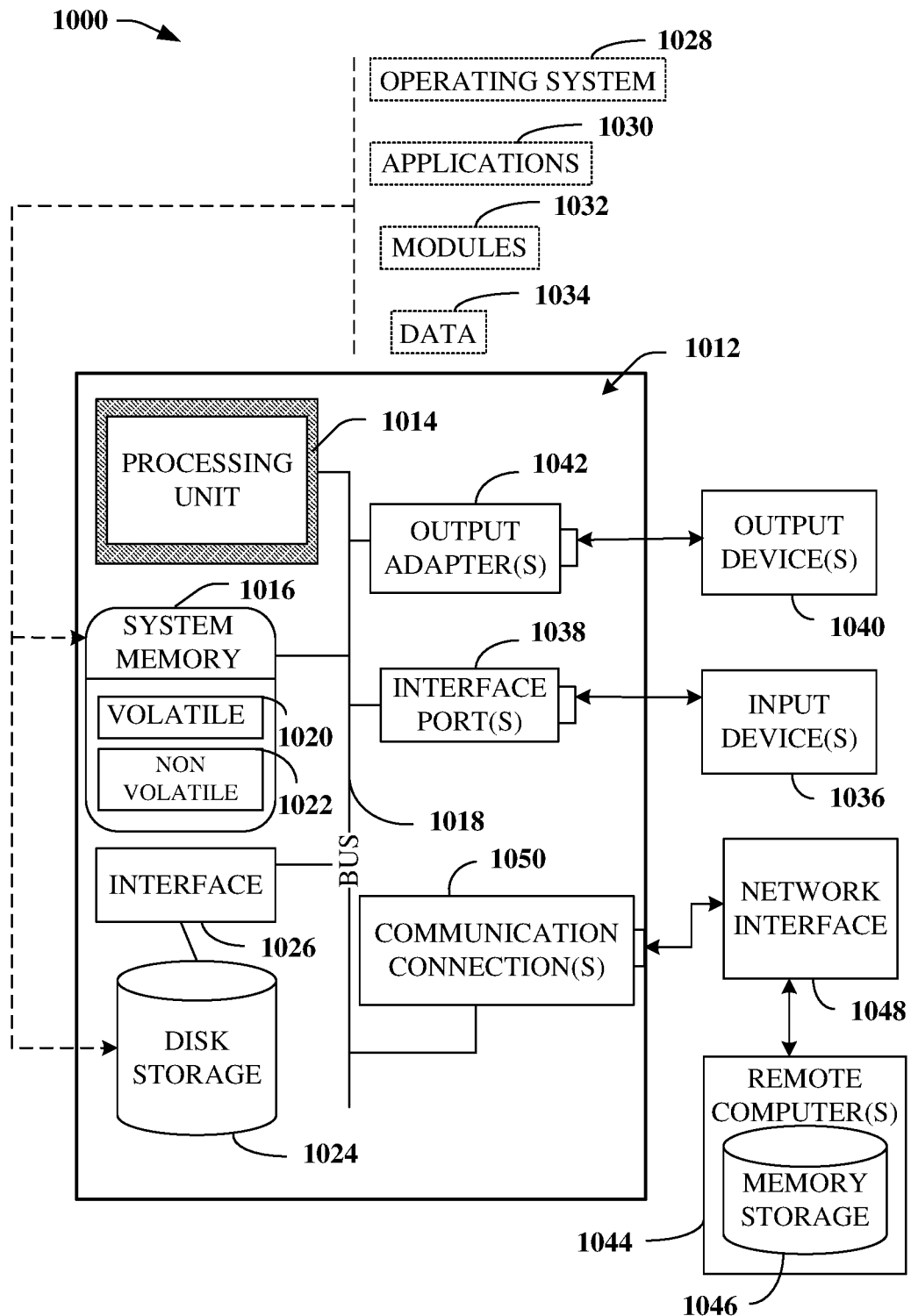
FIG. 10 illustrates an example block diagram of a computing system operable to execute the disclosed systems and methods in accordance with an embodiment.

In order to provide a context for the various embodiments of the disclosed subject matter, FIG. 10, and the following discussion, are intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated embodiments can also be practiced in distributed computing environments where tasks are performed by remote processing devices that are linked through a communications network; however, some if not all embodiments of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, processor component 104, stream topology component 120, 320, 420, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an example embodiment, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining an alternate ordered event stream topology based on the change in performance of the ordered event stream. The determining can occur in response to determining a change in a performance of an ordered event stream of an ordered event stream storage system. The operations can further comprise, in response to determining an occurrence of an implementation condition corresponding to an impediment to implementing the alternate ordered event stream topology, deferring implementation of the alternate ordered event stream topology, and in response to receiving an indication that the implementation condition has been resolved, facilitating committing of the alternate ordered event stream topology to the ordered event stream.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving an indication corresponding to a threshold amount of resource demand occurring in an existing portion of an ordered event stream of an ordered event stream storage system;
        determining an alternate ordered event stream topology for the ordered event stream; and
        deferring implementation of the alternate ordered event stream topology based on identifying an implementation condition; and
        in response to receiving an indication that the implementation condition has been resolved, implementing the alternate ordered event stream topology for the ordered event stream.

2. The system of claim 1, wherein the deferring of the implementation of the alternate ordered event stream topology comprises storing information correspond to the alternate ordered event stream topology.

3. The system of claim 2, wherein the storing is via an event stored by the ordered event stream.

4. The system of claim 2, wherein the storing is via an event stored by another ordered event stream.

5. The system of claim 1, wherein the deferring of the implementation of the alternate ordered event stream topology comprises mapping ordered event stream operations between a virtual implementation of the alternate ordered event stream topology and a last committed ordered event stream topology.

6. The system of claim 1, wherein the operations further comprise, in response to receiving an indication that the threshold amount of resource demand has reverted, discarding the alternate ordered event stream topology.

7. The system of claim 1, wherein the operations further comprise, in response to receiving a subsequent indication corresponding to another threshold amount of resource demand occurring in the existing portion of the ordered event stream of the ordered event stream storage system after deferring the implementation of the alternate ordered event stream topology, determining a subsequent alternate ordered event stream topology based on the alternate ordered event stream topology.

8. The system of claim 7, wherein the operations further comprise deferring implementation of the subsequent alternate ordered event stream topology based on identifying another implementation condition.

9. The system of claim 8, wherein the subsequent alternate ordered event stream topology is based on the alternate ordered event stream topology, and wherein the alternate ordered event stream topology is based on an ordered event stream topology.

10. The system of claim 7, wherein the operations further comprise scaling the ordered event stream from an ordered event stream topology prior to the alternate ordered event stream topology to the subsequent alternate ordered event stream topology in a manner that bypasses implementing the alternate ordered event stream topology.

11. The system of claim 10, wherein the subsequent alternate ordered event stream topology is based on the alternate ordered event stream topology, and wherein the alternate ordered event stream topology is based on the ordered event stream topology.

12. A method, comprising:
- determining, by a system comprising a processor, a change in a performance of an ordered event stream of an ordered event stream storage system;
- determining, by the system, an alternate ordered event stream topology for the ordered event stream based on the change in performance of the ordered event stream;
- in response to determining, by the system, an occurrence of an implementation condition corresponding to implementing the alternate ordered event stream topology, deferring implementation of the alternate ordered event stream topology; and
- in response to receiving, by the system, an indication that the implementation condition has been cured, permitting the alternate ordered event stream topology to be committed to the ordered event stream.

13. The method of claim 12, wherein the deferring implementation of the alternate ordered event stream topology comprises storing a representation of the alternate ordered event stream topology.

14. The method of claim 12, wherein the deferring of the implementation of the alternate ordered event stream topology comprises mapping ordered event stream operations between a virtual representation of the alternate ordered event stream topology and a last committed ordered event stream topology.

15. The method of claim 12, further comprising, in response to receiving, by the system, an indication that the change in the performance of the ordered event stream has reverted to past performance from before the change, discarding the alternate ordered event stream topology.

16. The method of claim 12, wherein the operations further comprise, in response to receiving, by the system, an indication of a subsequent change in the performance of the ordered event stream occurring after the deferring of the implementation of the alternate ordered event stream topology, implementing a subsequent alternate ordered event stream topology based on the alternate ordered event stream topology.

17. A non-transitory machine-readable medium, comprising executable instructions that, when executed by a processor, facilitate performance of operations, comprising:
- in response to determining a change in a performance of an ordered event stream of an ordered event stream storage system, determining an alternate ordered event stream topology based on the change in performance of the ordered event stream;
- in response to determining an occurrence of an implementation condition corresponding to an impediment to implementing the alternate ordered event stream topology, deferring implementation of the alternate ordered event stream topology; and
- in response to receiving an indication that the implementation condition has been resolved, facilitating committing of the alternate ordered event stream topology to the ordered event stream.

18. The non-transitory machine-readable medium of claim 17, wherein the deferring of the implementation of the alternate ordered event stream topology comprises mapping ordered event stream operations between a virtual representation of the alternate ordered event stream topology and a last committed ordered event stream topology.

19. The non-transitory machine-readable medium of claim 17, wherein the operations further comprise discarding the alternate ordered event stream topology in response to determining that the change in the performance of the ordered event stream has reverted.

20. The non-transitory machine-readable medium of claim 17, wherein the operations further comprise implementing a subsequent alternate ordered event stream topology based on the alternate ordered event stream topology in response to determining a subsequent change in the performance of the ordered event stream occurring after the deferring of the implementation of the alternate ordered event stream topology.

* * * * *